(12) United States Patent
Kaiser et al.

(10) Patent No.: US 12,481,358 B1
(45) Date of Patent: Nov. 25, 2025

(54) FOVEATED SENSING FOR EXTENDED REALITY

(71) Applicant: Snap Inc., Santa Monica, CA (US)

(72) Inventors: Jake Kaiser, Lafayette, CO (US); Weston Welge, Boulder, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/618,391

(22) Filed: Mar. 27, 2024

Related U.S. Application Data

(60) Provisional application No. 63/463,386, filed on May 2, 2023.

(51) Int. Cl.
*G06F 3/01* (2006.01)
*G06T 19/00* (2011.01)

(52) U.S. Cl.
CPC ............ *G06F 3/013* (2013.01); *G06T 19/006* (2013.01); *G06T 2200/24* (2013.01); *G06T 2210/22* (2013.01)

(58) Field of Classification Search
CPC ........... A63F 13/577; A63F 2300/8082; G02B 27/017; G02B 27/0101; G02B 27/0172; G06F 3/011; G06F 3/012; G06F 3/017; G06F 3/0346; G06F 3/04815; G06F 3/0484; G06F 3/0489; G06F 9/451; G06F 3/013; G06T 19/00; G06T 19/006; G06T 19/20; G06T 7/73; G06T 2200/24; G06T 2219/004; G06T 2219/2004;
(Continued)

(56) References Cited

U.S. PATENT DOCUMENTS

| 10,719,127 B1 | 7/2020 | Keith |
| 11,206,364 B1 * | 12/2021 | Price .................. G02B 27/0172 |
| 11,935,442 B1 | 3/2024 | Patton |

(Continued)

FOREIGN PATENT DOCUMENTS

| CN | 110349526 A | 10/2019 |
| WO | WO-2024097675 A1 | 5/2024 |

OTHER PUBLICATIONS

"U.S. Appl. No. 18/051,330, Non Final Office Action mailed Aug. 11, 2023", 16 pgs.

(Continued)

*Primary Examiner* — Nelson M Rosario
(74) *Attorney, Agent, or Firm* — Schwegman Lundberg & Woessner, P.A.

(57) ABSTRACT

An extended Reality (XR) system that provides services for determining three-dimensional (3D) data of physical objects in a real-world scene is provided. The XR system receives a request from an application to initiate a spatial scan of a real-world scene. In response, the XR system captures video frame data of the real-world scene and captures a pose of the XR system. The XR system determines a physical object in the real-world scene and determines a two-dimensional (2D) position of the physical object, using the video frame data. The XR system determines a depth of the physical object using the 2D position and determines a 3D position of the physical object in the real-world scene using the 2D position of the physical object, the depth of the physical object, and the pose of the XR system. The XR system communicates the 3D position data to the application.

21 Claims, 12 Drawing Sheets

(58) Field of Classification Search
CPC ... G06T 2219/2016; G06T 15/00; G06T 3/40; G06T 5/002; G06T 7/50; H04N 21/4524
See application file for complete search history.

(56) References Cited

U.S. PATENT DOCUMENTS

| | | |
|---|---|---|
| 2015/0294627 A1 | 10/2015 | Yoo et al. |
| 2019/0287495 A1 | 9/2019 | Mathur et al. |
| 2022/0146832 A1 | 5/2022 | Choi et al. |
| 2023/0419622 A1* | 12/2023 | Palangie .................. G06T 7/74 |
| 2024/0062487 A1* | 2/2024 | Palangie ................. G06F 3/011 |
| 2024/0112428 A1* | 4/2024 | Levi .................... G02B 27/017 |

OTHER PUBLICATIONS

"U.S. Appl. No. 18/051,330, Notice of Allowance mailed Nov. 6, 2023", 14 pgs.

"U.S. Appl. No. 18/051,330, Response filed Sep. 21, 2023 to Non Final Office Action mailed Aug. 11, 2023", 8 pgs.

"International Application Serial No. PCT/US2023/078226, International Search Report mailed Jan. 29, 2024", 5 pgs.

"International Application Serial No. PCT/US2023/078226, Written Opinion mailed Jan. 29, 2024", 8 pgs.

Toscani, Matteo, et al., "Foveal to peripheral extrapolation of brightness within objects", Journal of Vision, 17(9): 14, (2017), 14 pgs.

"International Application Serial No. PCT/US2023/078226, International Preliminary Report on Patentability mailed May 15, 2025", 10 pgs.

* cited by examiner

FOVEATED SENSING FOR EXTENDED REALITY

PRIORITY CLAIM

This application claims the benefit of U.S. Provisional Application No. 63/463,386, filed on May 2, 2023, which is hereby incorporated by reference in its entirety.

TECHNICAL FIELD

The present disclosure relates generally to extended reality systems, and more particularly, to extended reality systems with enhanced sensor processing.

BACKGROUND

A head-wearable apparatus may be implemented with a transparent or semi-transparent display through which a user of the head-wearable apparatus can view the surrounding environment. Such head-wearable apparatuses enable a user to see through the transparent or semi-transparent display to view the surrounding real-world environment, and to also see objects (e.g., virtual objects such as a rendering of a two-dimensional (2D) or three-dimensional (3D) graphic model, images, video, text, and so forth) that are generated for display to appear as a part of, and/or overlaid upon, the surrounding environment. This is typically referred to as "augmented reality" or "AR." A head-wearable apparatus may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays that occlude the user's eyes. As used herein, the term extended Reality (XR) refers to AR, VR, and/or any hybrids of these technologies unless the context indicates otherwise.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1A:
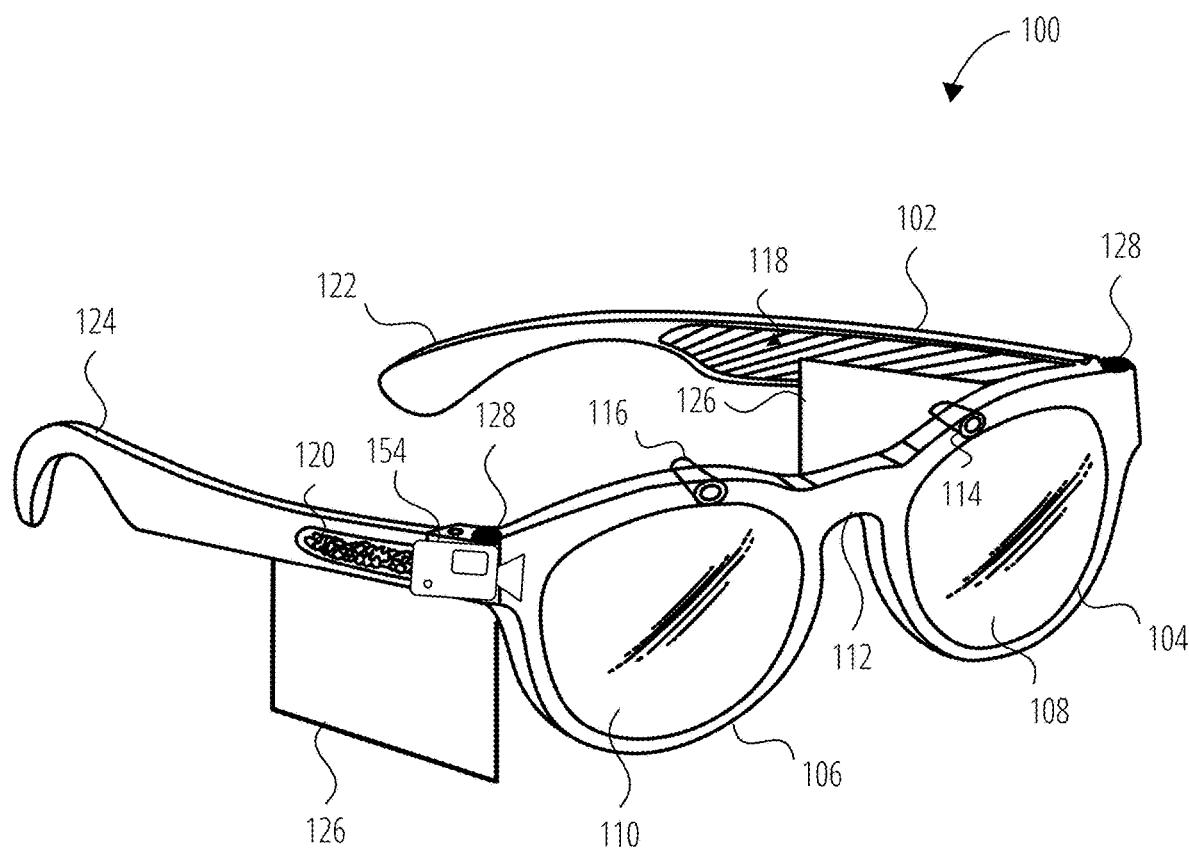
FIG. 1A is a perspective view of a head-wearable apparatus, in accordance with some examples.

XR systems use large Field Of View (FOV) sensors to collect visual data of a real-world scene for several purposes, such as estimating depth, classifying objects, and understanding details of the real-world scene. An amount of bandwidth and power required increases with the resolution and quantity of these sensors. The human visual system has highest visual acuity over a small FOV (~5°) in the center of vision, a region called the fovea. The visual acuity drops with distance from the fovea. Therefore, the user is most sensitive to accurate placement and interactions of XR virtual content with respect to the real world in this central 5° of their gaze.

In some examples, an XR system uses scanning sensors having a narrow FOV to capture data of a real-world scene. There are tradeoffs with scanning sensors between a lateral (x/y) spatial resolution, frame rate, field of view, scanning velocity, and data bandwidth. If the bandwidth is held constant (as is the case when a system is running at the maximum supported bandwidth), then there is a constant rate at which the scanning sensor is sampled (x samples per second). The spatial resolution is determined by the FOV and the scanning velocity and limited by the maximum bandwidth of the system. The maximum frame rate is determined by how long it takes for the scanning sensor to scan across the FOV. It is apparent that a tradeoff exists between frame rate and spatial resolution. A high frame rate implies a low spatial resolution and vice versa for a constant data bandwidth. An ideal scanning sensor would have high spatial resolution, high frame rate, and large FOV. However, doing so utilizes an ever increasing data bandwidth and scanning velocity. In space-constrained and power-constrained systems, such as head-worn XR system, these tradeoffs are balanced to achieve performance and power consumption goals.

Proper rendering of occlusions of virtual content by real-world objects is an objective of an immersive XR experience. In an example of a user holding a virtual object in their hand, if their thumb is in front of part of the virtual object but is not occluding it, then the user perceives the virtual object as floating in front of the hand. Similarly, if a 3D position of the hand is inaccurate, there might be a gap between the edge of the thumb and the rendering of the occluded edge of the virtual object, which also reduces immersion. Accurate occlusion rendering and accurate 3D placement of virtual content benefits form high-resolution depth estimation of the real world, but the user is only sensitive to this region of highly accurate sensing and rendering in the small region where their visual acuity is high.

Since the human visual acuity is high only over a small FOV, a scanning system may achieve high spatial resolution in this region and potentially reduce a data acquisition rate by only scanning this region. This results in data collection that is optimized where the user's vision is most sensitive. The spatial resolution is high where the user's visual acuity is high and little or no data is collected where the user's visual acuity is low. By reducing an amount of data collected, an amount of data processed may be reduced and, consequently, power consumption may be reduced as well.

In some examples, an XR system, in accordance with this disclosure, optimizes the performance and power consumption of sensors used to capture real-world scene data during an XR experience by using an eye gaze of a user of the XR system to indicate a region in space where an XR sensing pipeline of the XR system operates. By using an eye-tracking system to estimate the eye gaze of the user, other sensors of the XR system can be optimized by producing high resolution data at and near a gaze point of the eye gaze of the user and use low-resolution data or completely omit data far from the center of the eye gaze of the user. This may reduce the overall amount of resources that are consumed and may improve an overall efficiency of the system.

In some examples, an XR system uses an eye gaze of a user as an input to dynamically control various parameters of sensors used to capture real-world scene data. The XR system uses an eye-tracking component to estimate several parameters of one or more eyes of the user. In some examples, an XR system estimates a gaze vector, a vergence angle, and a 3D position of one or more eyes of the user. Eye motion can also be tracked over time to estimate if the user is in the process of changing where they are looking (saccade) or if the eyes are fixated in space. The gaze vector estimates a point of regard, or a foveal region where the user is looking. This vector, also known as a visual axis, is defined as the vector that passes through the center of the entrance and exit pupil of the eye and the center of the fovea centralis. The vergence angle refers to the horizontal angle between the individual gaze vectors and is used to estimate the depth of the location at which the user is looking. The 3D position of the eye refers to the 3D location in space and the rotational orientation of each eye in world coordinates. The XR system uses the gaze vectors and vergence angle as inputs to a control process for controlling one or more sensors.

In some examples, the one or more sensors comprise one or more scanning sensors. A scanning FOV of the one or more scanning sensors is restricted to a region around a fixation point of a gaze of a user using a gaze vector and a vergence angle determined from an eye-tracking system. In some examples, the scanning variables that are dynamically adjusted are a scanning velocity, a field of view, and a sampling rate. In some examples, the one or more scanning sensors comprise one or more point-scanning sensors such as, but not limited to Light Detecting and Ranging (LiDAR) sensors, and the like, used to capture depth data. In some examples, the one or more scanning sensors comprise one or more cameras having a scanning mechanism where the one or more cameras are used to capture image data.

In some examples, an XR system may use non-scanning sensors, such as a fixed camera having a fixed field of view and spatial resolution. An XR system uses eye-tracking data to crop an image around a gaze location of a user when the image is processed by the XR system thereby discarding data that is likely to be less relevant to what the user is focusing on. In an example, if a user is looking at their hands because they are using their hands to interact with virtual content, camera images can be cropped to only include the area including the hands for processing by a Machine Learning (ML)-based hand-tracking process.

Other technical features may be readily apparent to one skilled in the art from the following figures, descriptions, and claims.

Head-Wearable Apparatus

FIG. 1A is a perspective view of an XR user device in a form of a head-wearable apparatus 100, in accordance with some examples. The head-wearable apparatus 100 may be a client device of an XR system, such as XR system 602 of FIG. 6 or the head-wearable apparatus 100 may be a stand-alone XR system. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples, the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape so as to be partially disposed in one of the left temple piece 122 or the right temple piece 124. The computer 120 can include one or more processors with memory, wireless communication circuitry, and a power source. As discussed below, the computer 120 comprises low-power circuitry 526, high-speed circuitry 528, and a display processor. Various other examples may include these elements in different configurations or integrated together in different ways. Additional details of aspects of the computer 120 may be implemented as illustrated by the machine 200 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth. For example, the biometric sensors may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

In some examples, the head-wearable apparatus 100 comprises one or more sensors, such as sensor 154, that are used to capture data of a real-world scene. In some examples, the one or more sensors comprise one or more scanning sensors having a sensing or image forming component that is moveably coupled to the frame 102. In some examples, the one or more scanning sensors are point scanning sensors such as, but not limited to, LiDAR sensors and the like, that determine a distance or depth of a point on a physical object or surface in the real-world scene. In some examples, the one or more scanning sensors have a fixed FOV such as, but not limited to, scanning cameras and the like, that are used to capture image data of the real-world scene. In some examples, the one or more sensors are fixed sensors that are fixedly coupled to the frame 102, such as right camera 116 and left camera 114, that are not moveable relative to the frame 102.

The position sensors and motion sensors may include acceleration sensor components (e.g., accelerometer), gravitation sensor components, rotation sensor components (e.g., gyroscope), and the like. In some examples, the position sensors and motion sensors may be incorporated in an Inertial Measurement Unit (IMU) or the like.

In some examples, the head-wearable apparatus 100 identifies its position and orientation in three Dimensional (3D) space where the position and orientation taken together constitute a pose of the head-wearable apparatus 100. A pose is comprised of 6 values, 3 values for a position within a 3D Cartesian coordinate system having three orthogonal axis (a horizontal or X axis, a vertical or Y axis, and a depth or Z axis), and 3 values for a rotation around each respective axis (e.g., the Euler angles, such as ($\alpha$, $\beta$, $\gamma$), or pitch, yaw, and roll). The 6 values are compactly referred to as the 6 Dimensional (6D) pose of the device. A pose tracking component (not shown) of the head-wearable apparatus 100 may comprise sensors and components such as, but not limited to, the right camera 116, the left camera 114, a Global Positioning System (GPS), an IMU, gravitometers, and the like, whose outputs are combined to track movement, orientation, and position of the head-wearable apparatus 100. The task of determining the pose of the head-wearable apparatus 100 is referred to as pose estimation.

In some examples, the pose tracking component tracks the pose of the head-wearable apparatus 100 based on visual Simultaneous Location And Mapping (vSLAM) methodologies using the outputs of an IMU and one or more cameras of the head-wearable apparatus 100.

During an XR experience, the head-wearable apparatus 100 may continuously estimate its pose in a 3D coordinate system. The position of the head-wearable apparatus 100 is measured by the positional displacement of the head-wearable apparatus 100 from the origin of the 3D coordinate system and the orientation is measured by the angular (rotational) displacement of the axes of the head-wearable apparatus 100 from the axes of the 3D coordinate system. The position is expressed by a set of points, (e.g., cartesian coordinates), such as (x,y,z). The orientation is typically expressed by a set of rotation angles, (e.g., the Euler angles), such as ($\alpha$, $\beta$, $\gamma$). Other parameterizations to express the rotational displacement may be used, such as quaternions or angle-axis representations. The pose may be expressed as a transformation matrix or a mapping.

In some examples, the left camera 114 and the right camera 116 provide video frame data for use by the head-wearable apparatus 100 to extract 3D information from a real-world scene including depths or displacements along the Z axis from the head-wearable apparatus 100.

The head-wearable apparatus 100 may also construct and maintain one or more 3D reference frames with each reference frame comprising a respective coordinate system. For example, the head-wearable apparatus 100 may construct a local real-world scene reference frame, a global real-world reference frame, a reference frame associated to the head-wearable apparatus 100, and the like. Each reference frame may be associated with transformations that relate positions and orientations in the different reference systems. As an example, a depth measurement and a direction from the head-wearable apparatus 100 may be transformed into a local coordinate system of a local real-world scene reference frame to identify a location of a corresponding physical object in the real-world scene reference frame and coordinate system.

The head-wearable apparatus 100 may also include a touchpad 126 mounted to or integrated with one or both of the left temple piece 122 and right temple piece 124. The touchpad 126 is generally vertically arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
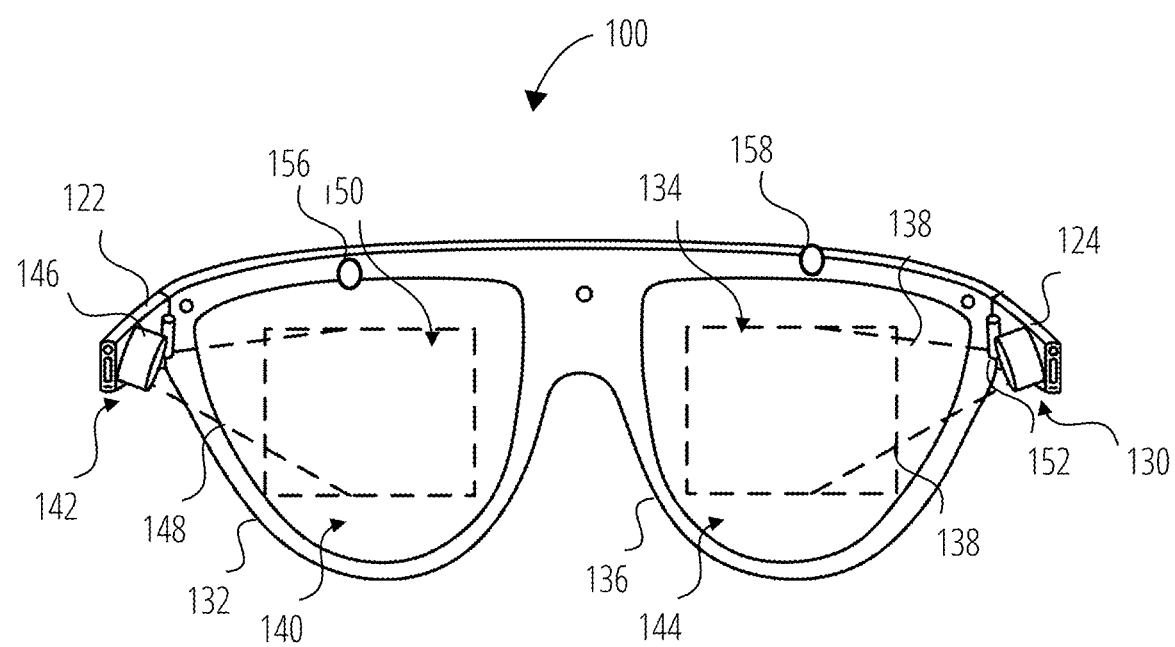
FIG. 1B is a further perspective view of the head-wearable apparatus of FIG. 1A, in accordance with some examples.

FIG. 1B illustrates the head-wearable apparatus 100 from the perspective of a user while wearing the head-wearable apparatus 100. For clarity, a number of the elements that are shown in FIG. 1A have been omitted in FIG. 1B. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphics Processing Unit (GPU), an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated, however, that other display technologies or configurations may be utilized within an optical engine to display an image to a user in the user's field of view. For example, instead of a projector and a waveguide, an LCD, LED or other display panel or surface may be provided.

In use, a user of the head-wearable apparatus 100 will be presented with information, content, and various user interfaces on the near eye displays. As described in more detail herein, the user can then interact with the head-wearable apparatus 100 using a touchpad 126 and/or the button 128, voice inputs or touch inputs on an associated device (e.g. mobile device 514 illustrated in FIG. 5), and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 comprises one or more eye-tracking sensors, such as eye-tracking sensor 156 and eye-tracking sensor 158, that are operable to capture eye-tracking data of one or more of eyes of a user of the head-wearable apparatus 100.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Machine Architecture

Figure 2:
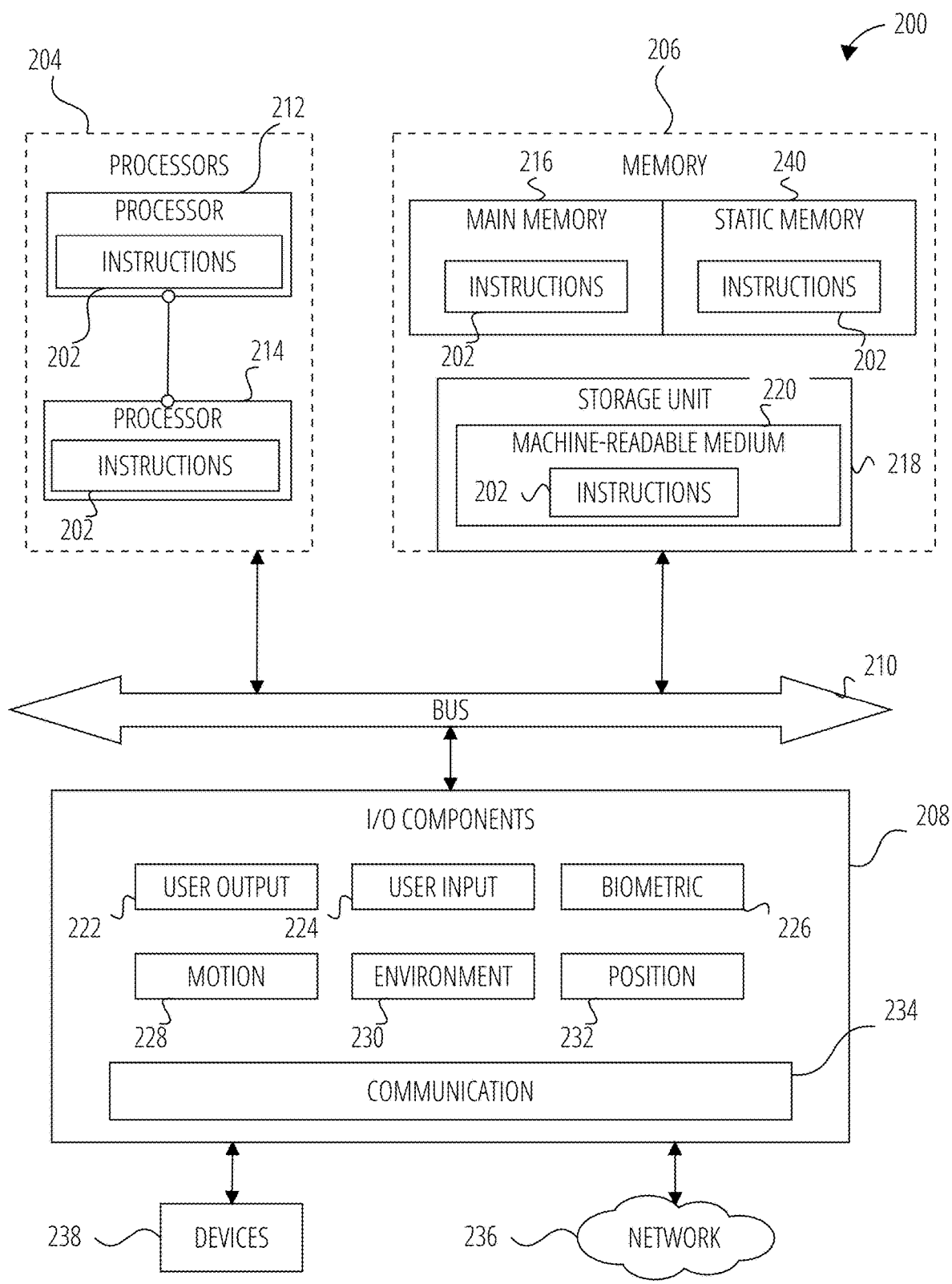
FIG. 2 is a diagrammatic representation of a machine that executes instructions that cause the machine to perform any one or more of the methodologies discussed herein, in accordance with some examples.

FIG. 2 is a diagrammatic representation of the machine 200 within which instructions 202 (e.g., software, a program, an application, an applet, an app, or other executable code) for causing the machine 200 to perform any one or more of the methodologies of a head-wearable apparatus or mobile device as discussed herein may be executed. For example, the instructions 202 may cause the machine 200 to execute any one or more of the methods described herein. The instructions 202 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 202, sequentially or otherwise, that specify actions to be taken by the machine 200. Further, while a single machine 200 is illustrated, the term "machine" shall also be taken to include a collection of machines that individually or jointly execute the instructions 202 to perform any one or more of the methodologies discussed herein. The machine 200, for example, may comprise the XR system 602 or any one of multiple server devices forming part of the interaction server system 612. In some examples, the machine 200 may also comprise both client and server systems, with certain operations of a particular method or algorithm being performed on the server-side and with certain operations of the particular method or algorithm being performed on the client-side.

The machine 200 may include processors 204, memory 206, and input/output I/O components 208, which may be configured to communicate with each other via a bus 210. In an example, the processors 204 (e.g., a Central Processing Unit (CPU), a Reduced Instruction Set Computing (RISC) Processor, a Complex Instruction Set Computing (CISC) Processor, a GPU, a Digital Signal Processor (DSP), an Application Specific Integrated Circuit (ASIC), a Radio-Frequency Integrated Circuit (RFIC), another processor, or any suitable combination thereof) may include, for example, a processor 212 and a processor 214 that execute the instructions 202. The term "processor" is intended to include multi-core processors that may comprise two or more independent processors (sometimes referred to as "cores") that may execute instructions contemporaneously. Although FIG. 2 shows multiple processors 204, the machine 200 may include a single processor with a single core, a single processor with multiple cores (e.g., a multi-core processor), multiple processors with a single core, multiple processors with multiples cores, or any combination thereof.

The memory 206 includes a main memory 216, a static memory 240, and a storage unit 218, both accessible to the processors 204 via the bus 210. The main memory 206, the static memory 240, and storage unit 218 store the instructions 202 embodying any one or more of the methodologies or functions described herein. The instructions 202 may also reside, completely or partially, within the main memory 216, within the static memory 240, within machine-readable medium 220 within the storage unit 218, within at least one of the processors 204 (e.g., within the processor's cache memory), or any suitable combination thereof, during execution thereof by the machine 200.

The I/O components 208 may include a wide variety of components to receive input, provide output, produce output, transmit information, exchange information, capture measurements, and so on. The specific I/O components 208 that are included in a particular machine will depend on the type of machine. For example, portable machines such as mobile phones may include a touch input device or other such input mechanisms, while a headless server machine will likely not include such a touch input device. It will be appreciated that the I/O components 208 may include many other components that are not shown in FIG. 2. In various examples, the I/O components 208 may include user output components 222 and user input components 224. The user output components 222 may include visual components (e.g., a display such as a plasma display panel (PDP), a Light-Emitting Diode (LED) display, a Liquid Crystal Display (LCD), a projector, or a cathode ray tube (CRT)), acoustic components (e.g., speakers), haptic components (e.g., a vibratory motor, resistance mechanisms), other signal generators, and so forth. The user input components 224 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

The environmental components 230 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

The position components 232 and the motion components 228 include location sensor components (e.g., a GPS receiver component), altitude sensor components (e.g., altimeters or barometers that detect air pressure from which altitude may be derived), orientation sensor components (e.g., magnetometers), and the like. In some examples, the position components 232 and the motion components 228 may be incorporated in an IMU or the like.

The biometric components 226 may include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

With respect to cameras, the machine 200 may have a camera system comprising, for example, front cameras on a front surface of a housing of the machine 200 and rear cameras on a rear surface of the housing of the machine 200. The front cameras may, for example, be used to capture still images and video of a user of the machine (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the XR system 602 may also include a 360° camera for capturing 360° photographs and videos.

Further, the camera system of the machine 200 may include dual rear cameras (e.g., a primary camera as well as a depth-sensing camera), or even triple, quadruple, or quintuple rear camera configurations on the front and rear sides of the machine 200. These multiple cameras systems may include a wide camera, an ultra-wide camera, a telephoto camera, a macro camera, and a depth sensor, for example.

Communication may be implemented using a wide variety of technologies. The I/O components 208 further include communication components 234 operable to couple the machine 200 to a network 236 or devices 238 via respective coupling or connections. For example, the communication components 234 may include a network interface component or another suitable device to interface with the network 236. In further examples, the communication components 234 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 238 may be another machine or any of a wide variety of peripheral devices (e.g., a peripheral device coupled via a USB).

Moreover, the communication components 234 may detect identifiers or include components operable to detect identifiers. For example, the communication components 234 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 234, such as location via Internet Protocol (IP) geolocation, location via Wi-Fi® signal triangulation, location via detecting an NFC beacon signal that may indicate a particular location, and so forth.

The various memories (e.g., main memory 216, static memory 240, and memory of the processors 204) and storage unit 218 may store one or more sets of instructions and data structures (e.g., software) embodying or used by any one or more of the methodologies or functions described herein. These instructions (e.g., the instructions 202), when executed by processors 204, cause various operations to implement the disclosed examples.

The instructions 202 may be transmitted or received over the network 236, using a transmission medium, via a network interface device (e.g., a network interface component included in the communication components 234) and using any one of several well-known transfer protocols (e.g., hypertext transfer protocol (HTTP)). Similarly, the instructions 202 may be transmitted or received using a transmission medium via a coupling (e.g., a peer-to-peer coupling) to the devices 238.

Foveated Scanning

Figure 3A:
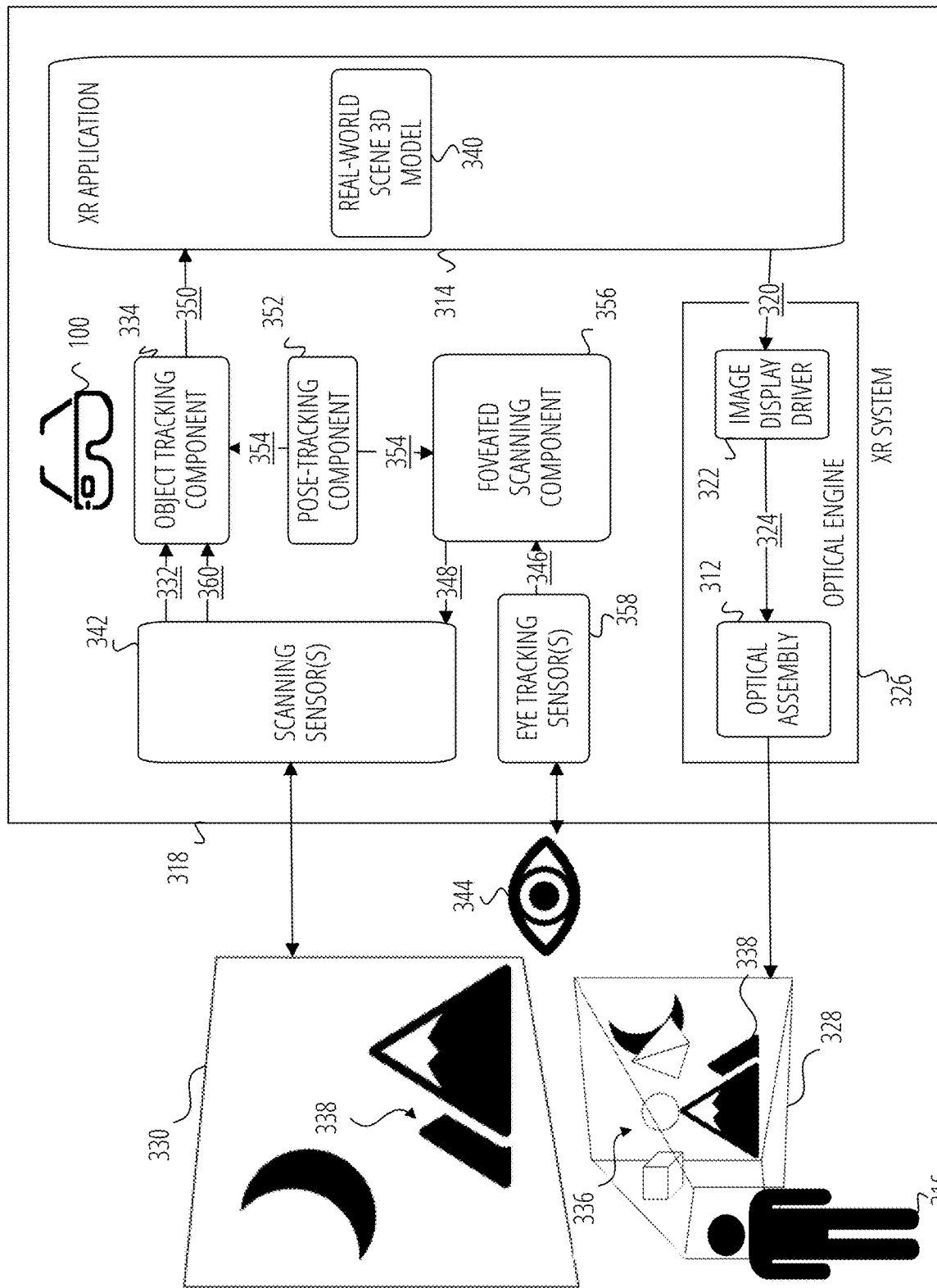
FIG. 3A is a collaboration diagram of components of an XR system, in accordance with some examples.
Figure 3B:
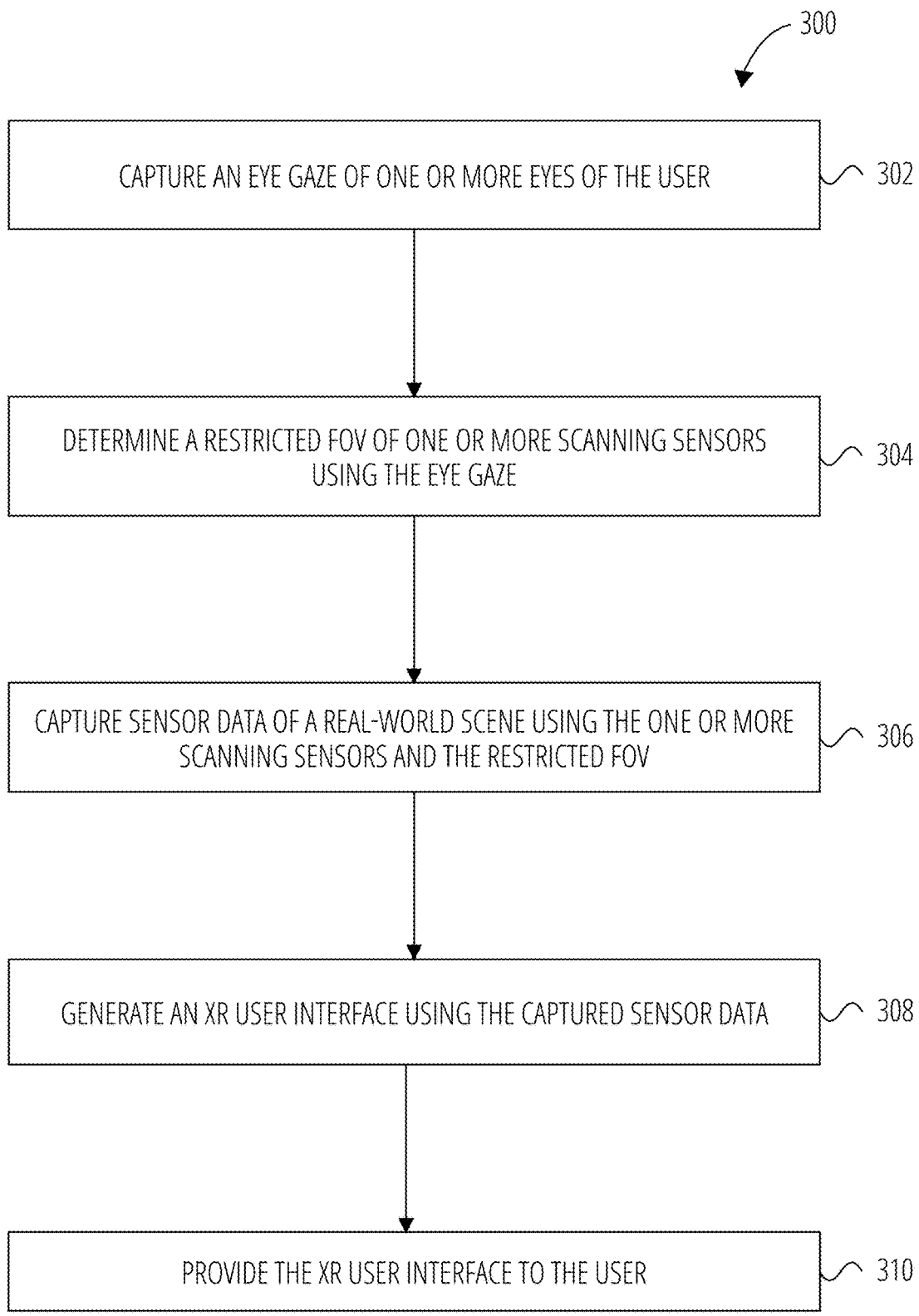
FIG. 3B is an activity diagram of a spatial scanning method, in accordance with some examples.

FIG. 3A is a collaboration diagram of components of an XR system 318 having scanning sensors, and FIG. 3B is a process flow diagram of a foveated scanning method 300 of the XR system 318, in accordance with some examples.

Although the foveated scanning method 300 depicts a particular sequence of operations, the sequence of operations may be altered without departing from the scope of the present disclosure. For example, some of the operations depicted may be performed in parallel, in a different sequence, or by different components of an XR system, without materially affecting the function of the method.

The foveated scanning method 300 is used by the XR system 318 to provide an XR user interface 328 to a user 316. The XR system 318 comprises an XR user device such as, but not limited to, a head-wearable apparatus 100 or the like. The XR system 318 provides an XR user interface 328 to the user 316 using the XR user device. The XR user interface 328 is generated by an XR application 314 of the XR system 318 that uses the services of the XR system 318 to perform a foveated scan of a real-world scene 330 including one or more physical objects 338. The XR application 314 may be a useful application such as an interactive game, maintenance guide, an interactive map, an interactive tour guide, a tutorial, or the like. The XR application 314 may also be an entertainment application such as a video game, an interactive video, or the like.

The physical objects 338 may include objects in the real-world scene 330 as well as one or more portions of the body of the user 316 such as, but not limited to, the hands of the user and the like.

In operation 302, the XR system 318 captures an eye gaze of one or more eyes 344 of the user 316 using the XR system. For example, XR system 318 uses one or more eye-tracking sensors 358, such as eye-tracking sensor 156 and eye-tracking sensor 158 (of FIG. 1B) of head-wearable apparatus 100 to capture eye-tracking data 346 of the one or more eyes 344 of the user 316. The one or more eye-tracking sensors 358 detect and measure a movement and position of the one or more eyes 344 of the user 316 in real-time. In some examples, the one or more eye-tracking sensors 358 use infrared light to illuminate the one or more eyes 344 of the user 316 and measure reflection of infrared light to determine where the one or more eyes 344 of the user 316 are looking. The one or more eye-tracking sensors 358 may use methodologies including, but not limited to corneal reflection, pupil center/corneal reflection, video-oculography, and the like. The eye-tracking data 346 comprises one or more parameters of the eye gaze of the one or more eyes 344 of the user 316 such as, but not limited to, a gaze vector and a vergence angle. A gaze vector estimates a point of regard, or a foveal region where the user is looking. This vector, also known as a visual axis, is defined as a vector that passes through the center of an entrance and exit pupil of an eye and the center of the fovea centralis of the eye. The vergence angle refers to a horizontal angle between individual gaze vectors of each eye of the user 316 and may be used to estimate the depth of the location at which the user is looking. The eye-tracking sensor 358 communicates the eye-tracking data 346 to a foveated scanning component 356.

In some examples, the foveated scanning component 356 receives pose data 354 of the XR system 318 from a pose-tracking component 352 of the XR system 318 and uses the pose data 354 along with the eye-tracking data 346 to determine a pose of the one or more eyes 344 of the user 316. The pose of the one or more eyes 344 comprises a 3D position of the one or more eyes 344 of the user 316. The 3D position of the eye refers to the 3D location in space and the rotational orientation of each eye in a coordinate system of the real-world scene 330. In some examples, the foveated scanning component 356 tracks eye motion over time to estimate if the user 316 is in the process of changing where they are looking (e.g., saccading) or if the eye gaze of the user is fixed in space.

In operation 304, the XR system 318 determines a restricted FOV for the one or more scanning sensors 342 of the XR system 318 using the eye gaze comprised of the eye-tracking data 346.

In some examples, the one or more scanning sensors 342 comprise one or more point scanning sensors such as, but not limited to, scanning LiDAR sensors. A scanning LiDAR sensor uses laser technology to create a 3D map of the real-world scene 330. The scanning LiDAR sensor emits laser pulses that bounce off objects in the environment, and then measures the time it takes for reflected laser light to return to the scanning LiDAR sensor. By calculating the time of flight of the laser light, the scanning LiDAR sensor determines a distance (termed a depth in XR applications) to objects in the real-world scene 330.

In some examples, a scanning LiDAR sensor comprises a laser, an actuator that is operable to scan a laser beam emitted by the laser, and a receiver that detects reflected laser light. The laser emits pulses of light that travel through the air and bounce off objects in the real-world scene 330. The reflected light is then detected by the receiver of the scanning LiDAR sensor. The actuator of the scanning LiDAR sensor allows the sensor to scan its surroundings in a defined FOV having a central optical axis and a scan angle of the FOV through which the laser beam is scanned in a horizontal and vertical direction, creating a detailed 3D map of the real-world scene 330.

In some examples, the foveated scanning component 356 determines a restricted FOV for a scanning LiDAR sensor by setting the optical axis of a scanning LiDAR sensor to be parallel with a gaze vector of the eye-tracking data 346. In some examples, the foveated scanning component 356 corrects for an offset of the scanning LiDAR sensor from the eye 344 of the user 316 using a pose of the eye 344 and a pose of the XR system 318. In some examples, the foveated scanning component 356 corrects the optical axis determined for the scanning LiDAR sensor using a vergence angle of the eye-tracking data 346. In addition, the foveated scanning component 356 determines the scan angle of the FOV of the scanning LiDAR sensor. The scan angle is a maximum angle from the optical axis that the scanning LiDAR will scan during a scanning operation. In an example, the foveated scanning component 356 determines a 5° scan angle as that is that is in accordance with the highest visual acuity of human vision.

In some examples, a laser and an actuator of a scanning LiDAR sensor are comprised of a Micro-Electro-Mechanical System (MEMS) device.

In some examples, an actuator of a scanning LiDAR sensor operates on a movable mirror that reflects the laser beam emitted by the laser into the real-world scene. In some examples, the laser, actuator, and movable mirror are comprised of a MEMS device.

In some examples, an actuator of a scanning LiDAR sensor is comprised of an electromechanical device. In some examples, the actuator is comprised of a solid-state actuator such as, but not limited to, a piezoelectric actuator.

In some examples, the one or more scanning sensors 342 comprise one or more scanning cameras having a fixed FOV. A scanning camera may comprise a sensor that is coupled to an actuator that is operable to move the sensor to scan the real-world scene 330. The foveated scanning component 356 sets an optical axis of the scanning camera to be parallel with a gaze vector of the eye-tracking data 346. In some examples, the foveated scanning component 356 corrects for an offset of the scanning camera from the eye 344 of the user 316 using a pose of the eye 344 and a pose of the XR system 318. In some examples, the foveated scanning component 356 corrects the optical axis determined for the scanning camera using a vergence angle of the eye-tracking data 346.

In some examples, the scanning camera comprises a MEMS device.

In some examples, an actuator of a scanning mirror operates on a movable mirror that reflects light from the real-world scene 330 into a sensor of the scanning camera. In some examples, an actuator and a mirror of a scanning camera are comprised of a MEMS device. In some examples, an actuator of a scanning camera is comprised of an electromechanical device. In some examples, an actuator of a scanning camera is comprised of a solid-state device.

In some examples, the foveated scanning component 356 controls a scanning velocity of the one or more scanning sensors 342 using a restricted FOV. For example, the foveated scanning component 356 may increase a scanning velocity outside of the restricted FOV (thereby lowering a spatial resolution of the scanning sensor outside of the restricted FOV) and decrease the scanning velocity inside of the restricted FOV (thereby increasing a resolution of the scanning sensor within the restricted FOV).

In some examples, the foveated scanning component 356 controls a sampling rate of the one or more scanning sensors 342 using a restricted FOV. For example, the foveated scanning component 356 may decrease a sampling rate outside of the restricted FOV (thereby lowering a spatial resolution of the scanning sensor outside of the restricted FOV) and increase the sampling rate inside of the restricted FOV (thereby increasing a resolution of the scanning sensor within the restricted FOV).

In some examples, the foveated scanning component 356 controls one or more scanning LiDAR sensors of the one or more scanning sensors 342 to capture depth data 332 of the real-world scene 330. The foveated scanning component 356 generates scanning control data 348 using the determined optical axis and scan angle of the FOV of the scanning LiDAR sensors that the foveated scanning component 356 uses to control the scanning of the one or more scanning LiDAR sensors. The one or more scanning LiDAR sensors generate depth data 332 of the real-world scene 330 and communicate the depth data 332 to an object tracking component 334 of the XR system 318.

In some examples, the foveated scanning component 356 controls one or more scanning cameras of the one or more scanning sensors 342 to capture image data 360 of the real-world scene 330. The foveated scanning component 356 generates scanning control data 348 using the determined optical axis of the scanning cameras. The foveated scanning component 356 uses the scanning control data 348 to control the scanning of the one or more scanning cameras. The one or more scanning cameras generate image data 360 of the real-world scene 330 and communicate the image data 360 to an object tracking component 334 of the XR system 318 and to an XR application 314 of the XR system 318.

In operation 306, the XR system 318 captures sensor data of the real-world scene 330 using the one or more scanning sensors 342 and the restricted FOVs determined for the one or more scanning sensors 342. For example, in a case where the one or more scanning sensors 342 comprise one or more scanning LiDAR sensors, the one or more scanning sensors 342 scan the real-world scene 330 and generate depth data 332 that is communicated to the object tracking component 334. The object tracking component 334 receives the depth data 332 and pose data 354 from the pose-tracking component 352 and generates tracking data 350 using the pose data 354 and the depth data 332. The object tracking component 334 uses the pose data 354 to determine where in the real-world scene 330 the XR system 318 is located and in which direction the one or more scanning sensors 342 were pointed when they captured the depth data 332. The pose-tracking component 352 uses the depth data 332 to detect edges and boundaries of objects in the real-world scene 330 relative to the XR system 318. The pose data 354 comprises an absolute location in the real-world scene 330 of the XR system 318. The pose-tracking component 352 uses the absolute location of the XR system 318 in the real-world scene 330 and the relative location of an object in relation to the XR system 318 to determine an absolute location in the real-world scene 330 of the object that is then encoded into the tracking data 350.

In an example where the one or more scanning sensors 342 comprise one or more scanning cameras, the one or more scanning sensors 342 scan the real-world scene 330 and generate image data 360 that is communicated to the object tracking component 334. The object tracking component 334 receives the image data 360 and pose data 354 from the pose-tracking component 352 and generates tracking data 350 using the pose data 354 and the image data 360. The object tracking component 334 uses the pose data 354 to determine where in the real-world scene 330 the XR system 318 is located and in which direction the one or more scanning sensors 342 were pointed when they captured the depth data 332. The pose-tracking component 352 uses the image data 360 to detect edges and boundaries of objects in the real-world scene 330 relative to the XR system 318. The pose data 354 comprises an absolute location in the real-world scene 330 of the XR system 318. The pose-tracking component 352 uses the absolute location of the XR system 318 in the real-world scene 330 and the relative location of an object in relation to the XR system 318 to determine an absolute location in the real-world scene 330 of the object that is then encoded into the tracking data 350.

In operation 308, the XR application 314 generates an XR user interface 328 containing virtual objects 336 provided to the user 316 in the context of the XR user interface 328. For example, the XR application 314 uses the tracking data 350 to generate a real-world scene 3D model 340 comprising the 3D positions of the detected physical objects in the real-world scene 330. The real-world scene 3D model 340 is a 3D model of a volume of space in the real-world scene 330 in which virtual objects 336 will be displayed to the user 316. The real-world scene 3D model 340 includes 3D position data of the virtual objects 336. The virtual objects 336 will be provided to the user in a binocular display such that the user 316 perceives the virtual objects 336 as being positioned in the real-world scene 330.

In operation 310, the XR system provides the XR user interface 328 to the user 316. For example, the XR application 314 generates XR user interface graphics data 320 using the real-world scene 3D model 340 and communicates the XR user interface graphics data 320 to an image display driver 322 of an optical engine 326 of the XR system 318. The image display driver 322 receives the XR user interface graphics data 320 and generates display control signals 324 using the XR user interface graphics data 320. The image display driver 322 uses the display control signals 324 to control the operations of an optical assembly 312 of the optical engine 326. In response to the display control signals 324, the optical assembly 312 generates visible images of the XR user interface 328 including rendered images of the virtual objects 336 and the visible images are provided to the user 316.

Figure 4A:
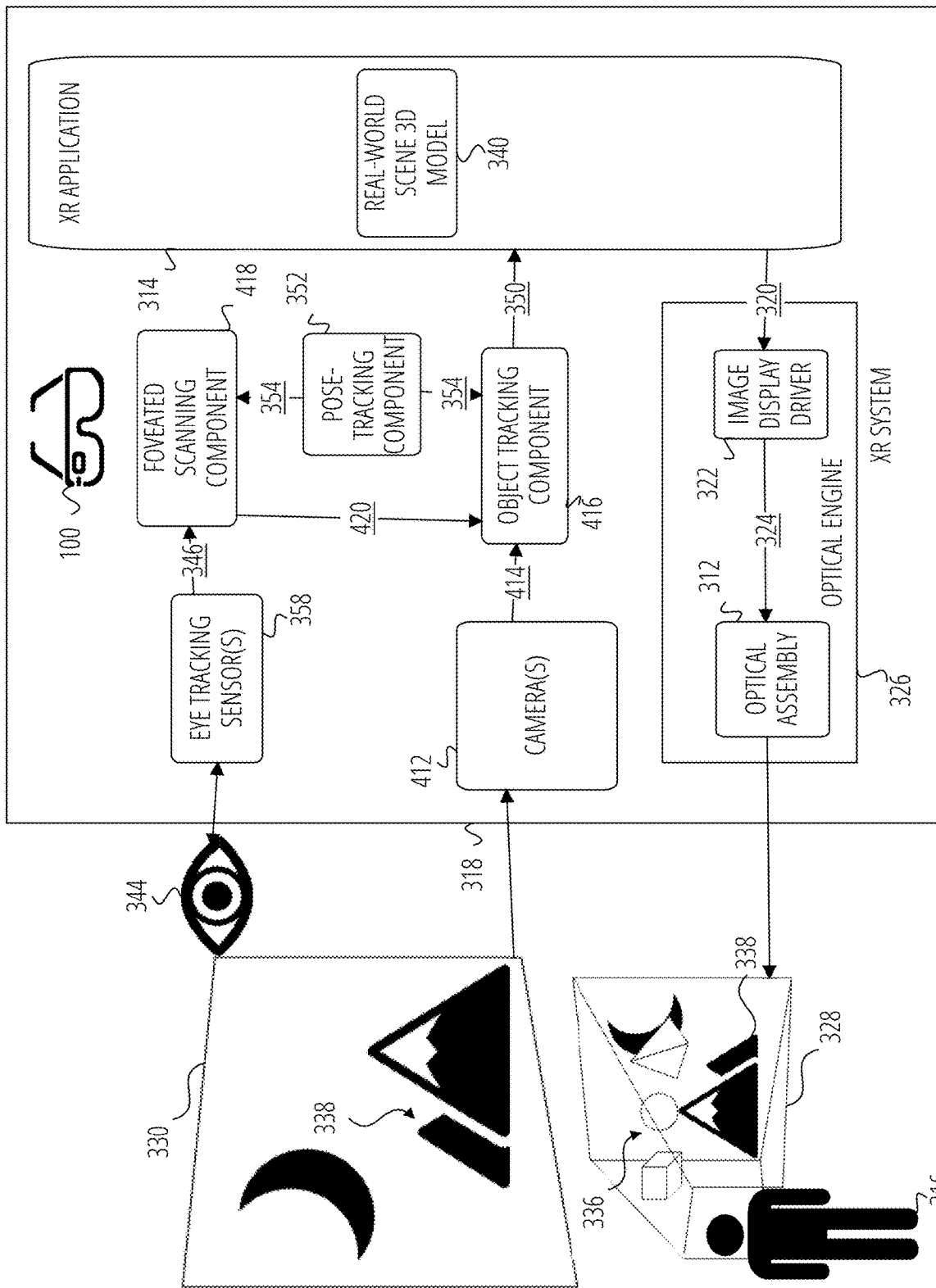
FIG. 4A is a collaboration diagram of components of an XR system, in accordance with some examples.
Figure 4B:
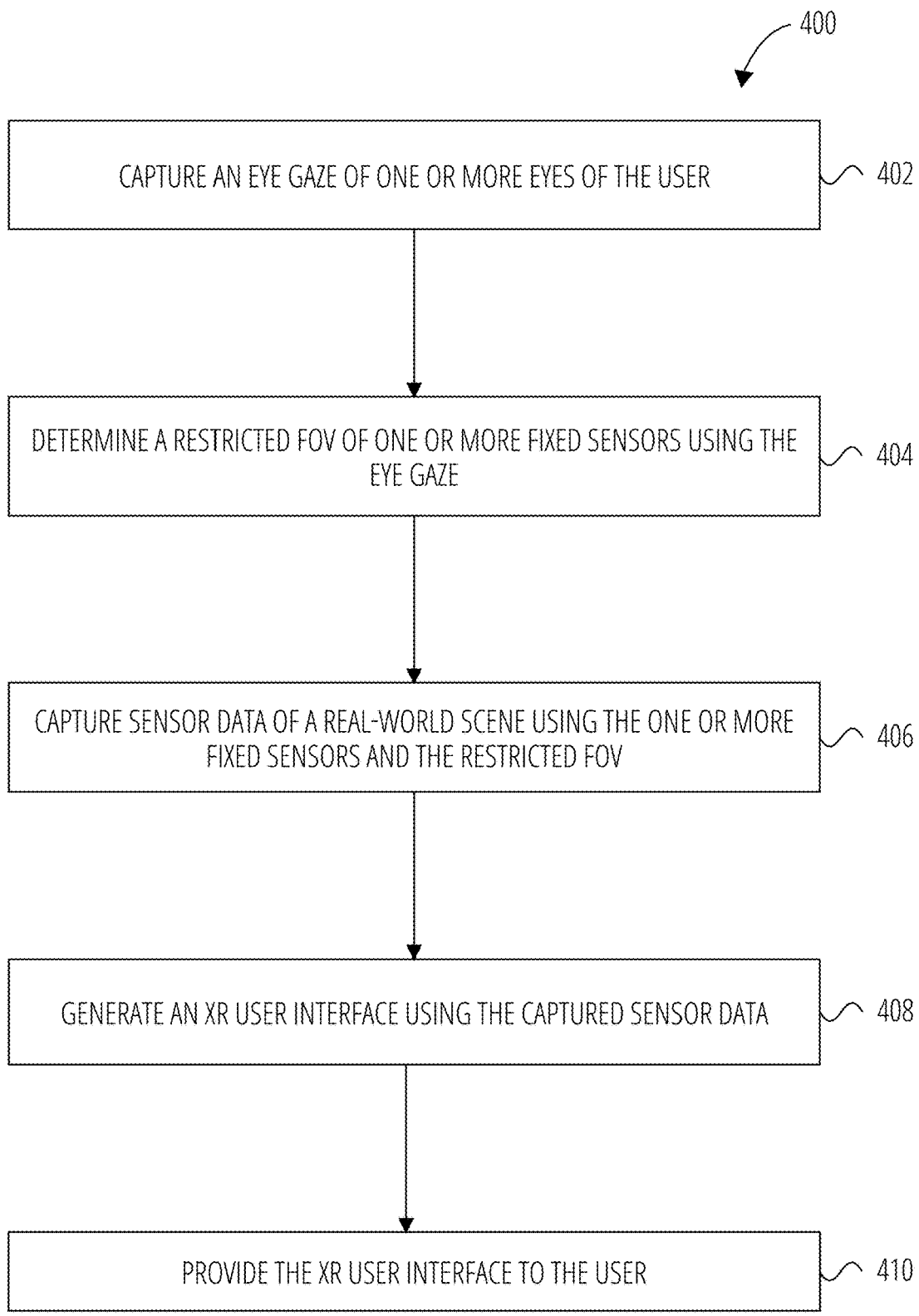
FIG. 4B is an activity diagram of a spatial scanning method, in accordance with some examples.

FIG. 4A is a collaboration diagram of components of an XR system having fixed sensors and FIG. 4B is a process flow diagram of a foveated scanning method of the XR system, in accordance with some examples. An XR system may use one or more fixed sensors such as, but not limited to, cameras, to capture image data used to generate tracking data of objects in a real-world scene. An XR system 318 uses a foveated scanning method 400 to restrict an effective FOV of one or more cameras 412 to reduce an amount of image data 414 that is processed by an object tracking component 416 to generate tracking data 350.

Although a foveated scanning method 400 depicts a particular sequence of operations, the sequence of operations may be altered without departing from the scope of the present disclosure. For example, some of the operations depicted may be performed in parallel, in a different sequence, or by different components of an XR system, without materially affecting the function of the method.

In operation 402, the XR system 318 captures an eye gaze of one or more eyes 344 of the user 316 as more fully described in reference to FIG. 3A and FIG. 3B.

In operation 404, the XR system 318 determines a restricted FOV of one or more fixed sensors of the XR system. For example, the XR system 318 determines a restricted FOV of an effective FOV of the one or more cameras 412 using the eye-tracking data 346 and pose data 354 received from the pose-tracking component 352 to generate cropping data 420 used to crop image data 414 generated by the one or more cameras 412.

In some examples, the one or more cameras 412 capture image data 414 of the real-world scene 330 and communicate the image data 414 to an object tracking component 416. The object tracking component 416 performs one or more operations using the image data 414 such as, but not limited to, tracking the hands of the user 316, identifying objects in the real-world scene 330, and the like. Each image of the image data 414 can be modeled as a region of a plane H pixels high by W pixels wide and perpendicular to an optical axis of the one or more cameras 412 at a fixed distance from the one or more cameras 412. The foveated scanning component 418 projects a gaze vector of the eye-tracking data 346 onto the region of the plane and determines an intersection of the gaze vector with the region of the plane. The foveated scanning component 418 generates a cropping box of a specified number of pixels high and a specified number of pixels wide centered on the intersection of the gaze vector and the region of the plane. The cropping data 420 is used to crop images of the image data 414 to a portion of the image centered on gaze vector of the user 316.

In operation 406, the XR system 318 captures sensor data of a real-world scene using the one or more fixed sensors and the restricted FOV. For example, the one or more cameras 412 capture image data 414 of the real-world scene 330 and communicate the image data 414 to the object tracking component 416. The foveated scanning component 418 communicates the cropping data 420 to the object tracking component 416. The object tracking component 416 uses the cropping data 420 to crop images of the image data 414 being received from the one or more cameras 412, thereby effectively restricting a FOV of the one or more cameras 412. The object tracking component 334 generates tracking data 350 using the cropped image data and communicates the tracking data 350 to the XR application 314.

In operation 408, the XR application 314 generates an XR user interface 328 containing virtual objects 336 provided to the user 316 in the context of the XR user interface 328. For example, the XR application 314 uses the tracking data 350 to generate a real-world scene 3D model 340 comprising the 3D positions of the detected physical objects in the real-world scene 330. The real-world scene 3D model 340 is a 3D model of a volume of space in the real-world scene 330 in which virtual objects 336 will be displayed to the user 316. The real-world scene 3D model 340 includes 3D position data of the virtual objects 336. The virtual objects 336 will be provided to the user in a binocular display such that the user 316 perceives the virtual objects 336 as being positioned in the real-world scene 330.

In operation 410, the XR system provides the XR user interface 328 to the user 316. For example, the XR application 314 generates XR user interface graphics data 320 using the real-world scene 3D model 340 and communicates the XR user interface graphics data 320 to an image display driver 322 of an optical engine 326 of the XR system 318. The image display driver 322 receives the XR user interface graphics data 320 and generates display control signals 324 using the XR user interface graphics data 320. The image display driver 322 uses the display control signals 324 to control the operations of an optical assembly 312 of the optical engine 326. In response to the display control signals 324, the optical assembly 312 generates visible images of the XR user interface 328 including rendered images of the virtual objects 336 and the visible images are provided to the user 316.

In some examples, the XR system 318 employs scanning sensors, such as the one or more scanning sensors 342 (of FIG. 3A) and fixed sensors, such as the one or more cameras 412, in various combinations to generate the tracking data 350. A foveated scanning component of the XR system 318 may manage the scanning sensors by simultaneously generating the scanning control data 348 (of FIG. 3A) and the cropping data 420 using the eye-tracking data 346.

Systems

Figure 5:
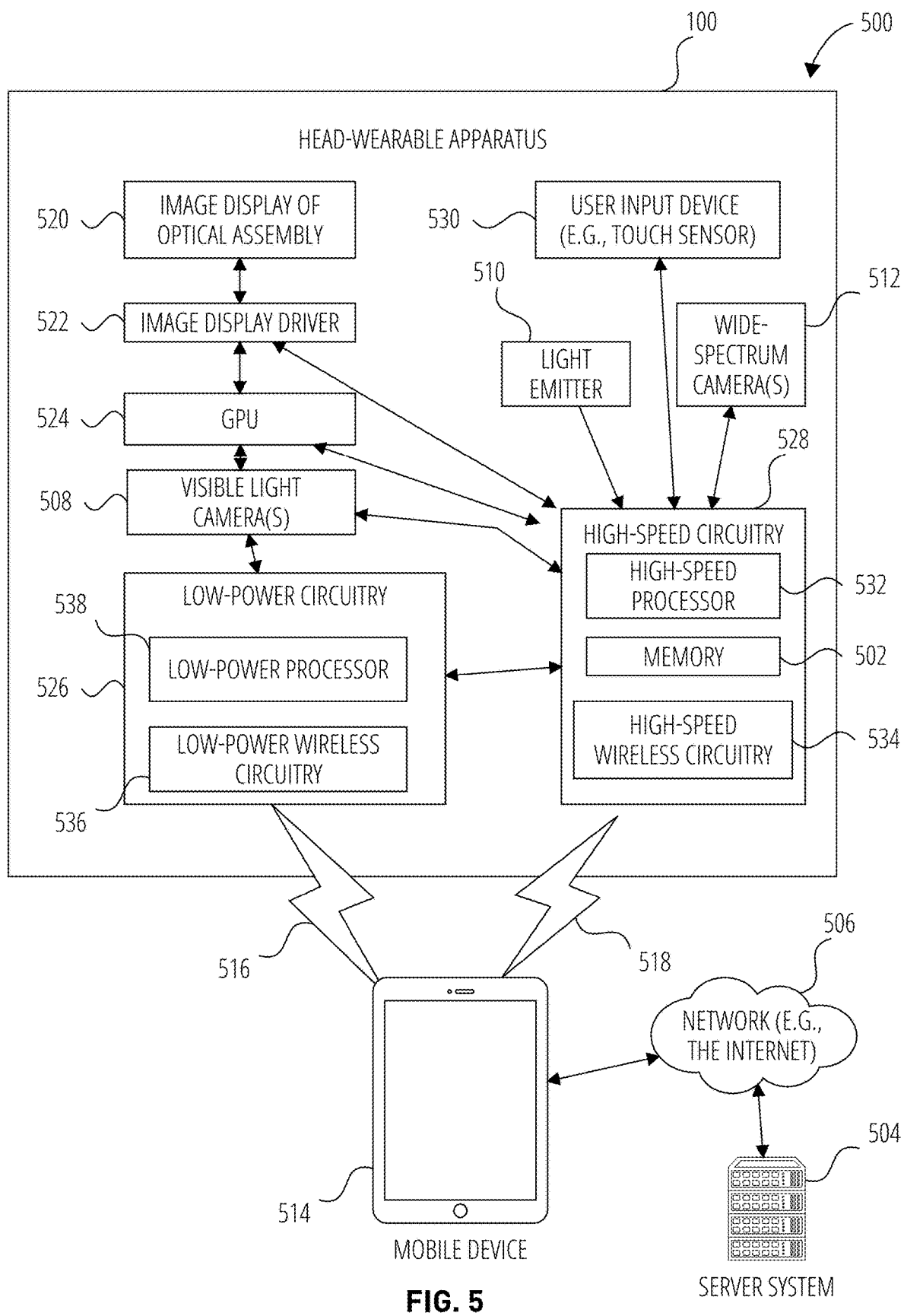
FIG. 5 illustrates a system of a head-wearable apparatus, in accordance with some examples.

FIG. 5 illustrates a system 500 including a head-wearable apparatus 100, according to some examples. FIG. 5 is a high-level functional block diagram of an example head-wearable apparatus 100 communicatively coupled to a mobile device 514 and various server systems 504 (e.g., the interaction server system 612) via various networks 610.

The head-wearable apparatus 100 includes one or more cameras, each of which may be, for example, one or more camera 508, a light emitter 510, and one or more wide-spectrum cameras 512.

The mobile device 514 connects with head-wearable apparatus 100 using both a low-power wireless connection 516 and a high-speed wireless connection 518. The mobile device 514 is also connected to the server system 504 and the network 506.

The head-wearable apparatus 100 further includes two image displays of the image display of optical assembly 520. The two image displays of optical assembly 520 include one associated with the left lateral side and one associated with the right lateral side of the head-wearable apparatus 100. The head-wearable apparatus 100 also includes an image display driver 522, and a GPU 524. The image display of optical assembly 520, image display driver 522, and GPU 524 constitute an optical engine of the head-wearable apparatus 100. The image display of optical assembly 520 is for presenting images and videos, including an image that can include a graphical user interface (GUI) to a user of the head-wearable apparatus 100.

The image display driver 522 commands and controls the image display of optical assembly 520. The image display driver 522 may deliver image data directly to the image display of optical assembly 520 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 530 (e.g., touch sensor or push button), including an input surface on the head-wearable apparatus 100. The user input device 530 (e.g., touch sensor or push button) is to receive from the user an input selection to manipulate the GUI of the presented image.

The components shown in FIG. 5 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right cameras 508 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 502, which stores instructions to perform a subset or all of the functions described herein. The memory 502 can also include storage device.

As shown in FIG. 5, the high-speed circuitry 528 includes a high-speed processor 532, a memory 502, and high-speed wireless circuitry 534. In some examples, the image display driver 522 is coupled to the high-speed circuitry 528 and operated by the high-speed processor 532 in order to drive the left and right image displays of the image display of optical assembly 520. The high-speed processor 532 may be any processor capable of managing high-speed communications and operation of any general computing system needed for the head-wearable apparatus 100. The high-speed processor 532 includes processing resources needed for managing high-speed data transfers on a high-speed wireless connection 518 to a wireless local area network (WLAN) using the high-speed wireless circuitry 534. In certain examples, the high-speed processor 532 executes an operating system such as a LINUX operating system or other such operating system of the head-wearable apparatus 100, and the operating system is stored in the memory 502 for execution. In addition to any other responsibilities, the high-speed processor 532 executing a software architecture for the head-wearable apparatus 100 is used to manage data transfers with high-speed wireless circuitry 534. In certain examples, the high-speed wireless circuitry 534 is configured to implement Institute of Electrical and Electronic Engineers (IEEE) 802.11 communication standards, also referred to herein as WiFi. In some examples, other high-speed communications standards may be implemented by the high-speed wireless circuitry 534.

The low-power wireless circuitry 536 and the high-speed wireless circuitry 534 of the head-wearable apparatus 100 can include short-range transceivers (Bluetooth™) and wireless wide, local, or wide area network (WAN) transceivers (e.g., cellular or WiFi). Mobile device 514, including the transceivers communicating via the low-power wireless connection 516 and the high-speed wireless connection 518, may be implemented using details of the architecture of the head-wearable apparatus 100, as can other elements of the network 506.

The memory 502 includes any storage device capable of storing various data and applications, including, among other things, camera data generated by the left and right cameras 508, the wide-spectrum cameras 512, and the GPU 524, as well as images generated for display by the image display driver 522 on the image displays of the image display of optical assembly 520. While the memory 502 is shown as integrated with high-speed circuitry 528, in some examples, the memory 502 may be an independent standalone element of the head-wearable apparatus 100. In certain such examples, electrical routing lines may provide a connection through a chip that includes the high-speed processor 532 from the GPU 524 or the low-power processor 538 to the memory 502. In some examples, the high-speed processor 532 may manage addressing of the memory 502 such that the low-power processor 538 will boot the high-speed processor 532 any time that a read or write operation involving memory 502 is needed.

As shown in FIG. 5, the low-power processor 538 or high-speed processor 532 of the head-wearable apparatus 100 can be coupled to the camera (camera 508, light emitter 510, or wide-spectrum cameras 512), the image display driver 522, the user input device 530 (e.g., touch sensor or push button), and the memory 502.

The head-wearable apparatus 100 is connected to a host computer. For example, the head-wearable apparatus 100 is paired with the mobile device 514 via the high-speed wireless connection 518 or connected to the server system 504 via the network 506. The server system 504 may be one or more computing devices as part of a service or network computing system, for example, that includes a processor, a memory, and network communication interface to communicate over the network 506 with the mobile device 514 and the head-wearable apparatus 100.

The mobile device 514 includes a processor and a network communication interface coupled to the processor. The network communication interface allows for communication over the network 506, low-power wireless connection 516, or high-speed wireless connection 518. Mobile device 514 can further store at least portions of the instructions for generating binaural audio content in the mobile device 514's memory to implement the functionality described herein.

Output components of the head-wearable apparatus 100 include visual components, such as a display such as a LCD, a PDP, a LED display, a projector, or a waveguide. The image displays of the optical assembly are driven by the image display driver 522. The output components of the head-wearable apparatus 100 further include acoustic components (e.g., speakers), haptic components (e.g., a vibratory motor), other signal generators, and so forth. The input components of the head-wearable apparatus 100, the mobile device 514, and server system 504, such as the user input device 530, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 516 and high-speed wireless connection 518 from the mobile device 514 via the low-power wireless circuitry 536 or high-speed wireless circuitry 534.

Networked Computing Environment

Figure 6:
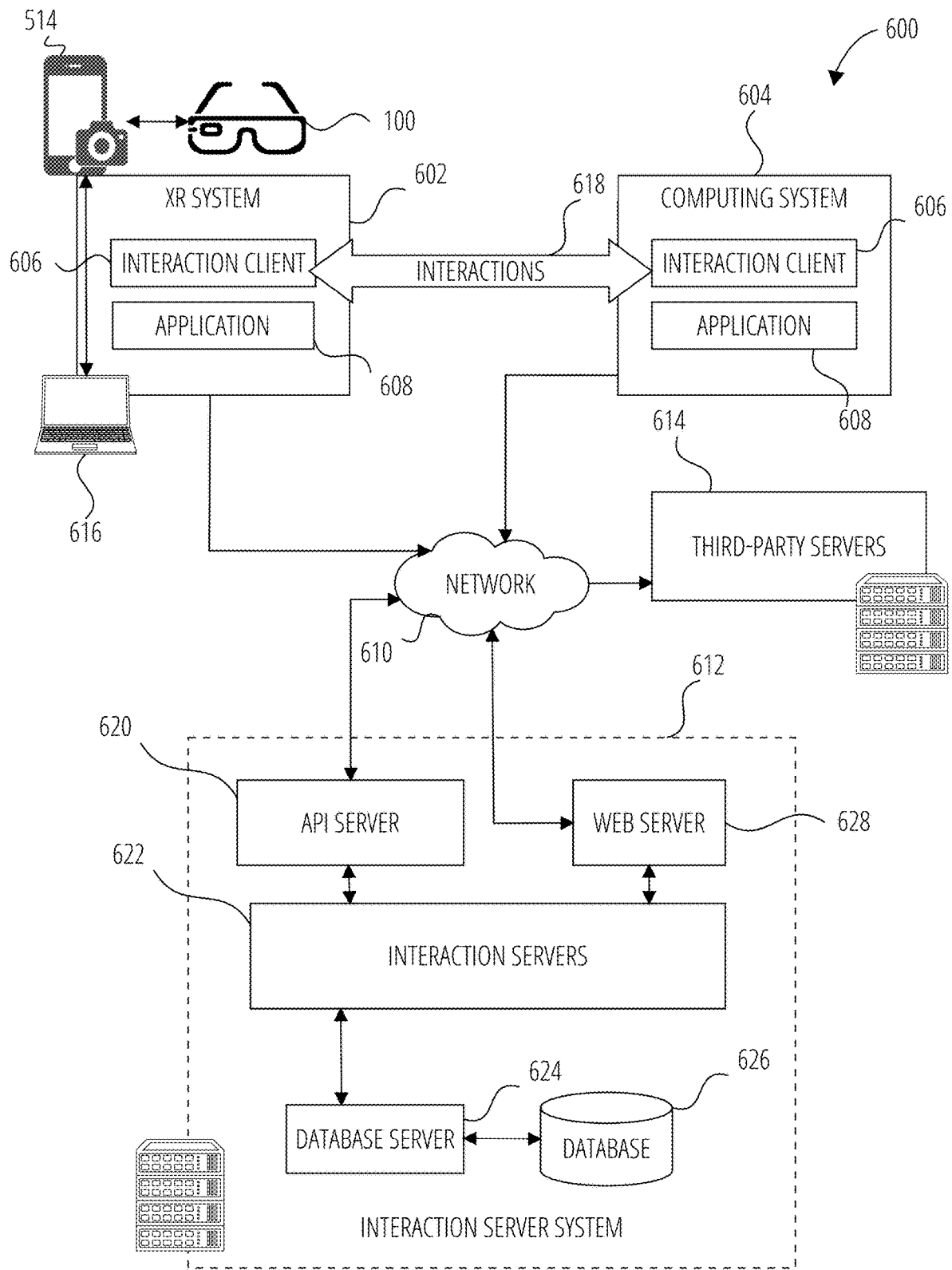
FIG. 6 is a collaboration diagram of a networked environment, in accordance with some examples.

FIG. 6 is a block diagram showing an example interaction system 600 for facilitating interactions (e.g., exchanging text messages, conducting text audio and video calls, or playing games) over a network. The interaction system 600 includes one or more XR systems, such as XR computing system 602, each of which hosts multiple applications, including an interaction client 606 and other applications 608. Each interaction client 606 is communicatively coupled, via one or more communication networks including a network 610 (e.g., the Internet), to other instances of the interaction client 606 (e.g., hosted on respective other computing systems such as computing system 604), an interaction server system 612 and third-party servers 614). An interaction client 606 can also communicate with locally hosted applications 608 using Application Programming Interfaces (APIs).

Each XR system 602 may comprise one or more user devices, such as a mobile device 514, head-wearable apparatus 100, and a computer client device 616 that are communicatively connected to exchange data and messages.

An interaction client 606 interacts with other interaction clients 606 and with the interaction server system 612 via the network 610. The data exchanged between the interaction clients 606 (e.g., interactions 618) and between the interaction clients 606 and the interaction server system 612 includes functions (e.g., commands to invoke functions) and payload data (e.g., text, audio, video, or other multimedia data).

The interaction server system 612 provides server-side functionality via the network 610 to the interaction clients 606. While certain functions of the interaction system 600 are described herein as being performed by either an interaction client 606 or by the interaction server system 612, the location of certain functionality either within the interaction client 606 or the interaction server system 612 may be a design choice. For example, it may be technically preferable to initially deploy particular technology and functionality within the interaction server system 612 but to later migrate this technology and functionality to the interaction client 606 where an XR system 602 has sufficient processing capacity.

The interaction server system 612 supports various services and operations that are provided to the interaction clients 606. Such operations include transmitting data to, receiving data from, and processing data generated by the interaction clients 606. This data may include message content, client device information, geolocation information, media augmentation and overlays, message content persistence conditions, social network information, and live event information. Data exchanges within the interaction system 600 are invoked and controlled through functions available via user interfaces (UIs) of the interaction clients 606.

Turning now specifically to the interaction server system 612, an API server 620 is coupled to and provides programmatic interfaces to Interaction servers 622, making the functions of the Interaction servers 622 accessible to interaction clients 606, other applications 608 and third-party server 614. The Interaction servers 622 are communicatively coupled to a database server 624, facilitating access to a database 626 that stores data associated with interactions processed by the Interaction servers 622. Similarly, a web server 628 is coupled to the Interaction servers 622 and provides web-based interfaces to the Interaction servers 622. To this end, the web server 628 processes incoming network requests over the HTTP and several other related protocols.

The API server 620 receives and transmits interaction data (e.g., commands and message payloads) between the interaction servers 622 and the XR system 602 (and, for example, interaction clients 606 and other applications 608) and the third-party server 614. Specifically, the API server 620 provides a set of interfaces (e.g., routines and protocols) that can be called or queried by the interaction client 606 and other applications 608 to invoke functionality of the interaction servers 622. The API server 620 exposes various functions supported by the interaction servers 622, including account registration; login functionality; the sending of interaction data, via the interaction servers 622, from a particular interaction client 606 to another interaction client 606; the communication of media files (e.g., images or video) from an interaction client 606 to the interaction servers 622; the settings of a collection of media data (e.g., a story); the retrieval of a list of friends of a user of an XR system 602; the retrieval of messages and content; the addition and deletion of entities (e.g., friends) to an entity graph (e.g., a social graph); the location of friends within a social graph; and opening an application event (e.g., relating to the interaction client 606).

The interaction servers 622 host multiple systems and subsystems, described below with reference to FIG. 8. Returning to the interaction client 606, features and functions of an external resource (e.g., a linked application 608 or applet) are made available to a user via an interface of the interaction client 606. In this context, "external" refers to the fact that the application 608 or applet is external to the interaction client 606. The external resource is often provided by a third party but may also be provided by the creator or provider of the interaction client 606. The interaction client 606 receives a user selection of an option to launch or access features of such an external resource. The external resource may be the application 608 installed on the XR system 602 (e.g., a "native app"), or a small-scale version of the application (e.g., an "applet") that is hosted on the XR system 602 or remote of the XR system 602 (e.g., on third-party servers 614). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 606. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 606 determines whether the selected external resource is a web-based external resource or a locally installed application 608. In some cases, applications 608 that are locally installed on the XR system 602 can be launched independently of and separately from the interaction client 606, such as by selecting an icon corresponding to the application 608 on a home screen of the XR system 602. Small-scale versions of such applications can be launched or accessed via the interaction client 606 and, in some examples, no or limited portions of the small-scale application can be accessed outside of the interaction client 606. The small-scale application can be launched by the interaction client 606 receiving, from a third-party server 614 for example, a markup-language document associated with the small-scale application and processing such a document.

In response to determining that the external resource is a locally installed application 608, the interaction client 606 instructs the XR system 602 to launch the external resource by executing locally-stored code corresponding to the external resource. In response to determining that the external resource is a web-based resource, the interaction client 606 communicates with the third-party servers 614 (for example) to obtain a markup-language document corresponding to the selected external resource. The interaction client 606 then processes the obtained markup-language document to present the web-based external resource within a user interface of the interaction client 606.

The interaction client 606 can notify a user of the XR system 602, or other users related to such a user (e.g., "friends"), of activity taking place in one or more external resources. For example, the interaction client 606 can provide participants in a conversation (e.g., a chat session) in the interaction client 606 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 606, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 606. The external resource can selectively include different media items in the responses, based on a current context of the external resource.

The interaction client 606 can present a list of the available external resources (e.g., applications 608 or applets) to a user to launch or access a given external resource. This list can be presented in a context-sensitive menu. For example, the icons representing different ones of the application 608 (or applets) can vary based on how the menu is launched by the user (e.g., from a conversation interface or from a non-conversation interface).

Data Architecture

Figure 7:
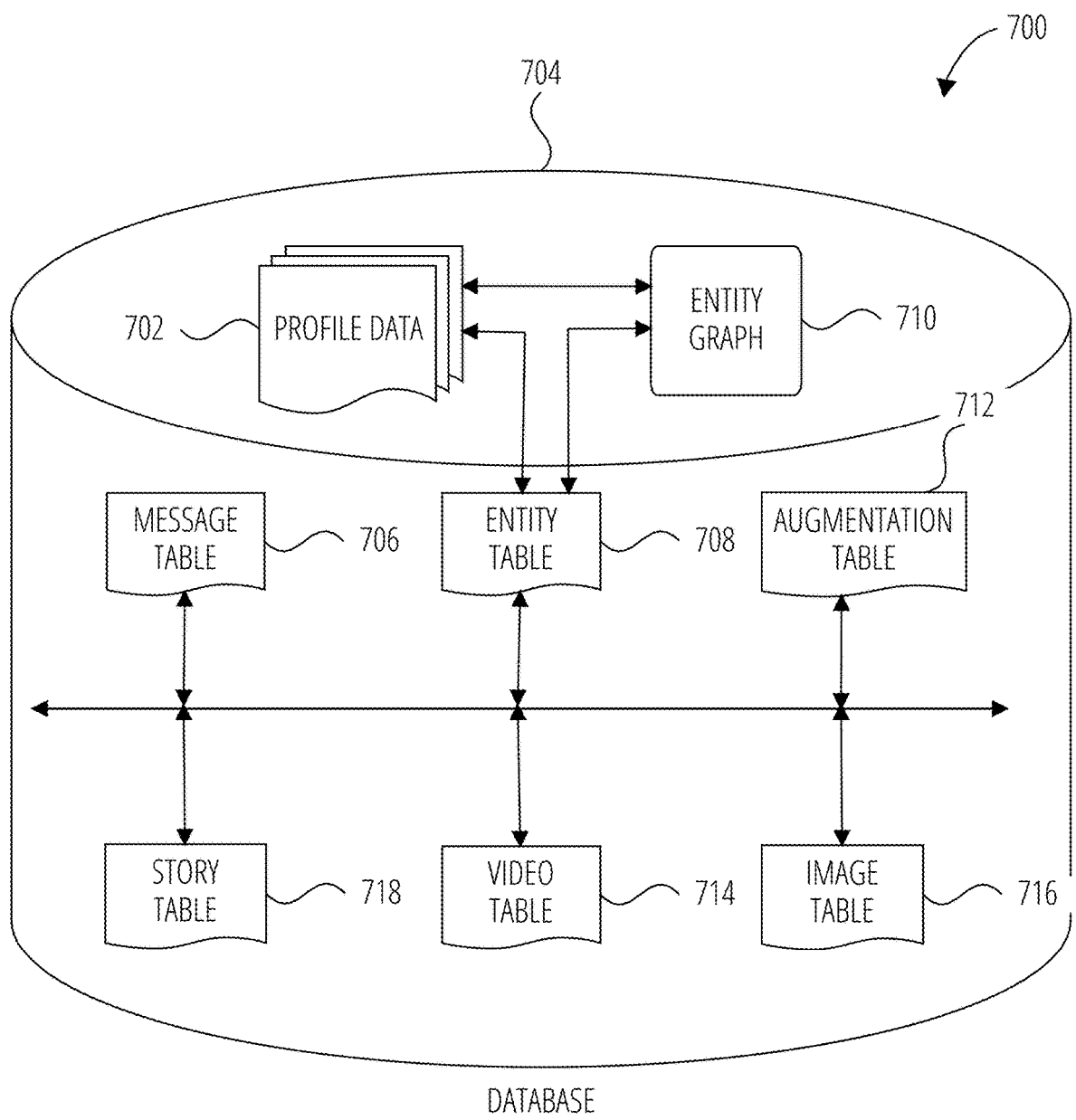
FIG. 7 is a diagrammatic representation of a data structure as maintained in a database, in accordance with some examples.

FIG. 7 is a schematic diagram illustrating data structures 700, which may be stored in the database 704 of the interaction server system 612, according to certain examples. While the content of the database 704 is shown to comprise multiple tables, it will be appreciated that the data could be stored in other types of data structures (e.g., as an object-oriented database).

The database 704 includes message data stored within a message table 706. This message data includes, for any particular message, at least message sender data, message recipient (or receiver) data, and a payload. Further details regarding information that may be included in a message, and included within the message data stored in the message table 706, are described below with reference to FIG. 7.

An entity table 708 stores entity data, and is linked (e.g., referentially) to an entity graph 710 and profile data 702. Entities for which records are maintained within the entity table 708 may include individuals, corporate entities, organizations, objects, places, events, and so forth. Regardless of entity type, any entity regarding which the interaction server system 612 stores data may be a recognized entity. Each entity is provided with a unique identifier, as well as an entity type identifier (not shown).

The entity graph 710 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 600.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user and may significantly restrict or block the publication of digital content from the individual user to the commercial user. A particular user, as an example of an entity, may record certain restrictions (e.g., by way of privacy settings) in a record for that entity within the entity table 708. Such privacy settings may be applied to all types of relationships within the context of the interaction system 600 or may selectively be applied to only certain types of relationships.

The profile data 702 stores multiple types of profile data about a particular entity. The profile data 702 may be selectively used and presented to other users of the interaction system 600 based on privacy settings specified by a particular entity. Where the entity is an individual, the profile data 702 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 600, and on map interfaces displayed by interaction clients 606 to other users. The collection of avatar representations may include "status avatars," which present a graphical representation of a status or activity that the user may select to communicate at a particular time.

Where the entity is a group, the profile data 702 for the group may similarly include one or more avatar representations associated with the group, in addition to the group name, members, and various settings (e.g., notifications) for the relevant group.

The database 704 also stores augmentation data, such as overlays or filters, in an augmentation table 712. The augmentation data is associated with and applied to videos (for which data is stored in a video table 714) and images (for which data is stored in an image table 716).

Filters, in some examples, are overlays that are displayed as overlaid on an image or video during presentation to a message receiver. Filters may be of various types, including user-selected filters from a set of filters presented to a message sender by the interaction client 606 when the message sender is composing a message. Other types of filters include geolocation filters (also known as geo-filters), which may be presented to a message sender based on geographic location. For example, geolocation filters specific to a neighborhood or special location may be presented within a user interface by the interaction client 606, based on geolocation information determined by a GPS unit of the XR system 602.

Another type of filter is a data filter, which may be selectively presented to a message sender by the interaction client 606 based on other inputs or information gathered by the XR system 602 during the message creation process. Examples of data filters include current temperature at a specific location, a current speed at which a message sender is traveling, battery life for an XR system 602, or the current time.

Other augmentation data that may be stored within the image table 716 includes XR content items (e.g., corresponding to applying XR experiences to live or previously captured images or video). An XR content item may be a real-time special effect and sound that may be added to an image or a video.

As described above, augmentation data includes XR, VR, and XR content items, overlays, image transformations, images, and modifications that may be applied to image data (e.g., videos or images). This includes real-time modifications, which modify an image as it is captured using device sensors (e.g., one or multiple cameras) of the XR system 602 and then displayed on a screen of the XR system 602 with the modifications. This also includes modifications to stored content, such as video clips in a collection or group that may be modified. For example, in an XR system 602 with access to multiple XR content items, a user can use a single video clip with multiple XR content items to see how the different XR reality content items will modify the stored clip. Similarly, real-time video capture may use modifications to show how video images currently being captured by sensors of an XR system 602 would modify the captured data. Such data may simply be displayed on the screen and not stored in memory, or the content captured by the device sensors may be recorded and stored in memory with or without the modifications (or both). In some systems, a preview feature can show how different XR content items will look within different windows in a display at the same time. This can, for example, enable multiple windows with different pseudorandom animations to be viewed on a display at the same time.

Data and various systems using XR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In some examples, tracking of points on an object may be used to place an image or texture (which may be 2D or 3D) at the tracked position. In still further examples, neural network analysis of video frames may be used to place images, models, or textures in content (e.g., images or frames of video). XR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an ASM algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the XR system 602) and perform complex image manipulations locally on the XR system 602 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the XR system 602.

In some examples, a computer animation model to transform image data can be used by a system where a user may capture an image or video stream of the user (e.g., a selfie) using the XR system 602 having a neural network operating as part of an interaction client 606 operating on the XR system 602. The transformation system operating within the interaction client 606 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a GUI displayed on the XR system 602 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The GUI, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 718 stores data regarding collections of messages and associated image, video, or audio data, which are compiled into a collection (e.g., a story or a gallery). The creation of a particular collection may be initiated by a particular user (e.g., each user for which a record is maintained in the entity table 708). A user may create a "personal story" in the form of a collection of content that has been created and sent/broadcast by that user. To this end, the user interface of the interaction client 606 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 606, to contribute content to a particular live story. The live story may be identified to the user by the interaction client 606, based on his or her location. The end result is a "live story" told from a community perspective.

A further type of content collection is known as a "location story," which enables a user whose XR system 602 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 714 stores video data that, in some examples, is associated with messages for which records are maintained within the message table 706. Similarly, the image table 716 stores image data associated with messages for which message data is stored in the entity table 708. The entity table 708 may associate various augmentations from the augmentation table 712 with various images and videos stored in the image table 716 and the video table 714.

The databases 704 also includes social network information collected by the social network system 822.

System Architecture

Figure 8:
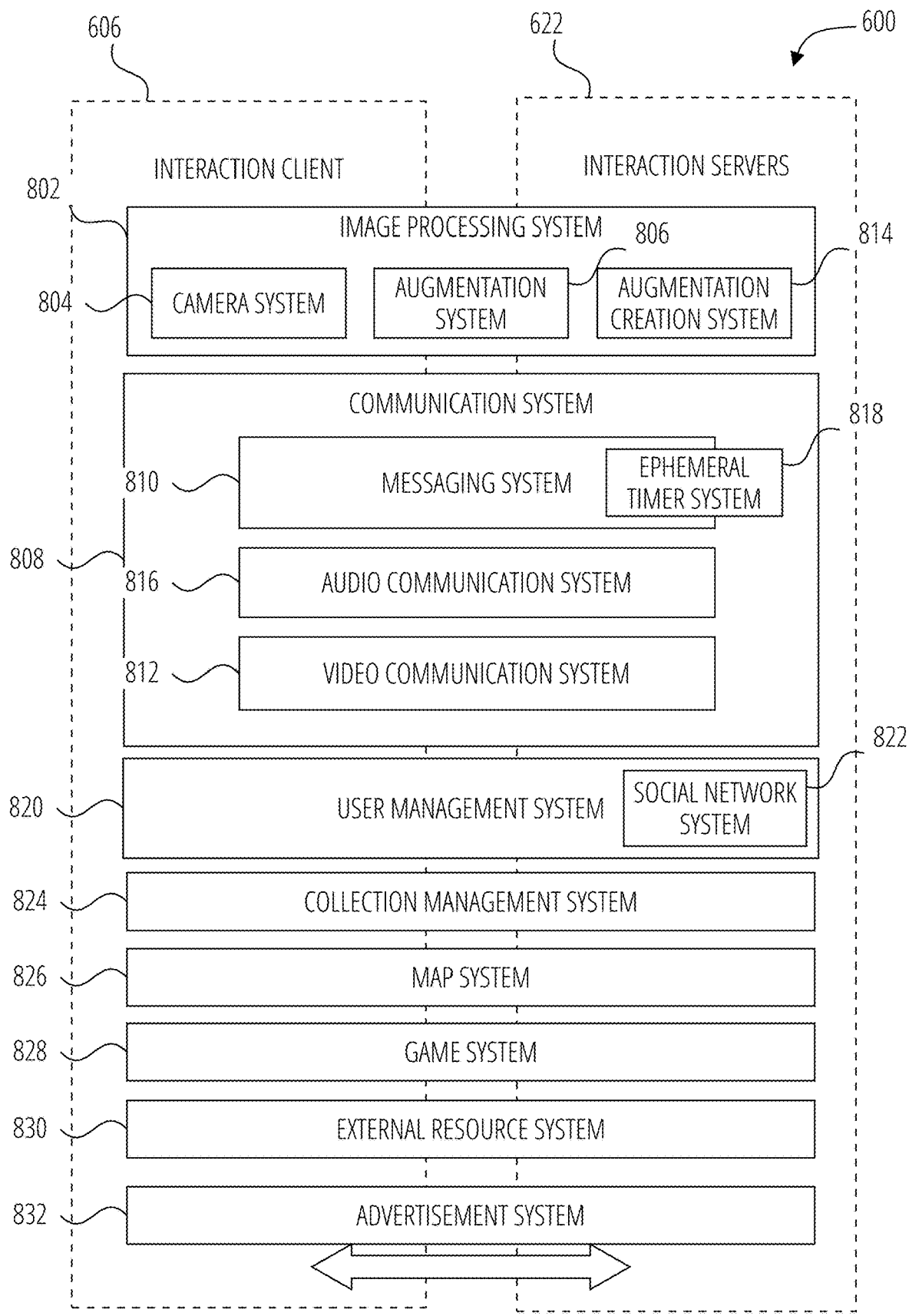
FIG. 8 is a diagrammatic representation of a messaging system that has client-side and server-side functionality, in accordance with some examples.

FIG. 8 is a block diagram illustrating further details regarding the interaction system 600, according to some examples. Specifically, the interaction system 600 is shown to comprise the interaction client 606 and the interaction servers 622. The interaction system 600 embodies multiple subsystems, which are supported on the client-side by the interaction client 606 and on the server-side by the interaction servers 622. Example subsystems are discussed below.

An image processing system 802 provides various functions that enable a user to capture and augment (e.g., augment or otherwise modify or edit) media content associated with a message.

A camera system 804 includes control software (e.g., in a camera application) that interacts with and controls hardware camera hardware (e.g., directly or via operating system controls) of the XR system 602 to modify and augment real-time images captured and displayed via the interaction client 606.

The augmentation system 806 provides functions related to the generation and publishing of augmentations (e.g., media overlays) for images captured in real-time by cameras of the XR system 602 or retrieved from memory of the XR system 602. For example, the augmentation system 806 operatively selects, presents, and displays media overlays (e.g., an image filter or an image lens) to the interaction client 606 for the augmentation of real-time images received via the camera system 804 or stored images retrieved from memory 502 of an XR system 602. These augmentations are selected by the augmentation system 806 and presented to a user of an interaction client 606, based on a number of inputs and data, such as for example:

Geolocation of the XR system 602; and
Social network information of the user of the XR system 602.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at XR system 602 for communication in a message, or applied to video content, such as a video content stream or feed transmitted from an interaction client 606. As such, the image processing system 802 may interact with, and support, the various subsystems of the communication system 808, such as the messaging system 810 and the video communication system 812.

A media overlay may include text or image data that can be overlaid on top of a photograph taken by the XR system 602 or a video stream produced by the XR system 602. In some examples, the media overlay may be a location overlay (e.g., Venice beach), a name of a live event, or a name of a merchant overlay (e.g., Beach Coffee House). In further examples, the image processing system 802 uses the geolocation of the XR system 602 to identify a media overlay that includes the name of a merchant at the geolocation of the XR system 602. The media overlay may include other indicia associated with the merchant. The media overlays may be stored in the databases 626 and accessed through the database server 624.

The image processing system 802 provides a user-based publication platform that enables users to select a geolocation on a map and upload content associated with the selected geolocation. The user may also specify circumstances under which a particular media overlay should be offered to other users. The image processing system 802 generates a media overlay that includes the uploaded content and associates the uploaded content with the selected geolocation.

The augmentation creation system 814 supports XR developer platforms and includes an application for content creators (e.g., artists and developers) to create and publish augmentations (e.g., XR experiences) of the interaction client 606. The augmentation creation system 814 provides a library of built-in features and tools to content creators including, for example custom shaders, tracking technology, and templates.

In some examples, the augmentation creation system 814 provides a merchant-based publication platform that enables merchants to select a particular augmentation associated with a geolocation via a bidding process. For example, the augmentation creation system 814 associates a media overlay of the highest bidding merchant with a corresponding geolocation for a predefined amount of time.

A communication system 808 is responsible for enabling and processing multiple forms of communication and interaction within the interaction system 600 and includes a messaging system 810, an audio communication system 816, and a video communication system 812. The messaging system 810 is responsible for enforcing the temporary or time-limited access to content by the interaction clients 606. The messaging system 810 incorporates multiple timers (e.g., within an ephemeral timer system 818) that, based on duration and display parameters associated with a message or collection of messages (e.g., a story), selectively enable access (e.g., for presentation and display) to messages and associated content via the interaction client 606. Further details regarding the operation of the ephemeral timer system 818 are provided below. The audio communication system 816 enables and supports audio communications (e.g., real-time audio chat) between multiple interaction clients 606. Similarly, the video communication system 812 enables and supports video communications (e.g., real-time video chat) between multiple interaction clients 606.

A user management system 820 is operationally responsible for the management of user data and profiles, and includes a social network system 822 that maintains social network information regarding relationships between users of the interaction system 600.

A collection management system 824 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 824 may also be responsible for publishing an icon that provides notification of a particular collection to the user interface of the interaction client 606. The collection management system 824 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 824 employs machine vision (or image recognition technology) and content rules to curate a content collection automatically. In certain examples, compensation may be paid to a user to include user-generated content into a collection. In such cases, the collection management system 824 operates to automatically make payments to such users to use their content.

A map system 826 provides various geographic location functions and supports the presentation of map-based media content and messages by the interaction client 606. For example, the map system 826 enables the display of user icons or avatars (e.g., stored in profile data 702) on a map to indicate a current or past location of "friends" of a user, as well as media content (e.g., collections of messages including photographs and videos) generated by such friends, within the context of a map. For example, a message posted by a user to the interaction system 600 from a specific geographic location may be displayed within the context of a map at that particular location to "friends" of a specific user on a map interface of the interaction client 606. A user can furthermore share his or her location and status information (e.g., using an appropriate status avatar) with other users of the interaction system 600 via the interaction client 606, with this location and status information being similarly displayed within the context of a map interface of the interaction client 606 to selected users.

A game system 828 provides various gaming functions within the context of the interaction client 606. The interaction client 606 provides a game interface providing a list of available games that can be launched by a user within the context of the interaction client 606 and played with other users of the interaction system 600. The interaction system 600 further enables a particular user to invite other users to participate in the play of a specific game by issuing invitations to such other users from the interaction client 606. The interaction client 606 also supports audio, video, and text messaging (e.g., chats) within the context of gameplay, provides a leaderboard for the games, and also supports the provision of in-game rewards (e.g., coins and items).

An external resource system 830 provides an interface for the interaction client 606 to communicate with remote servers (e.g., third-party servers 614) to launch or access external resources, i.e., applications or applets. Each third-party server 614 hosts, for example, a markup language (e.g., HTML5) based application or a small-scale version of an application (e.g., game, utility, payment, or ride-sharing application). The interaction client 606 may launch a web-based resource (e.g., application) by accessing the HTML5 file from the third-party servers 614 associated with the web-based resource. Applications hosted by third-party servers 614 are programmed in JavaScript leveraging a Software Development Kit (SDK) provided by the interaction servers 622. The SDK includes APIs with functions that can be called or invoked by the web-based application. The interaction servers 622 host a JavaScript library that provides a given external resource access to specific user data of the interaction client 606. HTML5 is an example of technology for programming games, but applications and resources programmed based on other technologies can be used.

To integrate the functions of the SDK into the web-based resource, the SDK is downloaded by the third-party server 614 from the interaction servers 622 or is otherwise received by the third-party server 614. Once downloaded or received, the SDK is included as part of the application code of a web-based external resource. The code of the web-based resource can then call or invoke certain functions of the SDK to integrate features of the interaction client 606 into the web-based resource.

The SDK stored on the interaction server system 612 effectively provides the bridge between an external resource (e.g., applications 608 or applets) and the interaction client 606. This gives the user a seamless experience of communicating with other users on the interaction client 606 while also preserving the look and feel of the interaction client 606. To bridge communications between an external resource and an interaction client 606, the SDK facilitates communication between third-party servers 614 and the interaction client 606. A Web ViewJavaScriptBridge running on an XR system 602 establishes two one-way communication channels between an external resource and the interaction client 606. Messages are sent between the external resource and the interaction client 606 via these communication channels asynchronously. Each SDK function invocation is sent as a message and callback. Each SDK function is implemented by constructing a unique callback identifier and sending a message with that callback identifier.

By using the SDK, not all information from the interaction client 606 is shared with third-party servers 614. The SDK limits which information is shared based on the needs of the external resource. Each third-party server 614 provides an HTML5 file corresponding to the web-based external resource to interaction servers 622. The interaction servers 622 can add a visual representation (such as a box art or other graphic) of the web-based external resource in the interaction client 606. Once the user selects the visual representation or instructs the interaction client 606 through a GUI of the interaction client 606 to access features of the web-based external resource, the interaction client 606 obtains the HTML5 file and instantiates the resources to access the features of the web-based external resource.

The interaction client 606 presents a GUIe (e.g., a landing page or title screen) for an external resource. During, before, or after presenting the landing page or title screen, the interaction client 606 determines whether the launched external resource has been previously authorized to access user data of the interaction client 606. In response to determining that the launched external resource has been previously authorized to access user data of the interaction client 606, the interaction client 606 presents another GUI of the external resource that includes functions and features of the external resource. In response to determining that the launched external resource has not been previously authorized to access user data of the interaction client 606, after a threshold period of time (e.g., 3 seconds) of displaying the landing page or title screen of the external resource, the interaction client 606 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 606 adds the external resource to a list of authorized external resources and allows the external resource to access user data from the interaction client 606. The external resource is authorized by the interaction client 606 to access the user data under an OAuth 2 framework.

The interaction client 606 controls the type of user data that is shared with external resources based on the type of external resource being authorized. For example, external resources that include full-scale applications (e.g., an application 608) are provided with access to a first type of user data (e.g., 2D avatars of users with or without different avatar characteristics). As another example, external resources that include small-scale versions of applications (e.g., web-based versions of applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

An advertisement system 832 operationally enables the purchasing of advertisements by third parties for presentation to end-users via the interaction clients 606 and also handles the delivery and presentation of these advertisements.

Software Architecture

Figure 9:
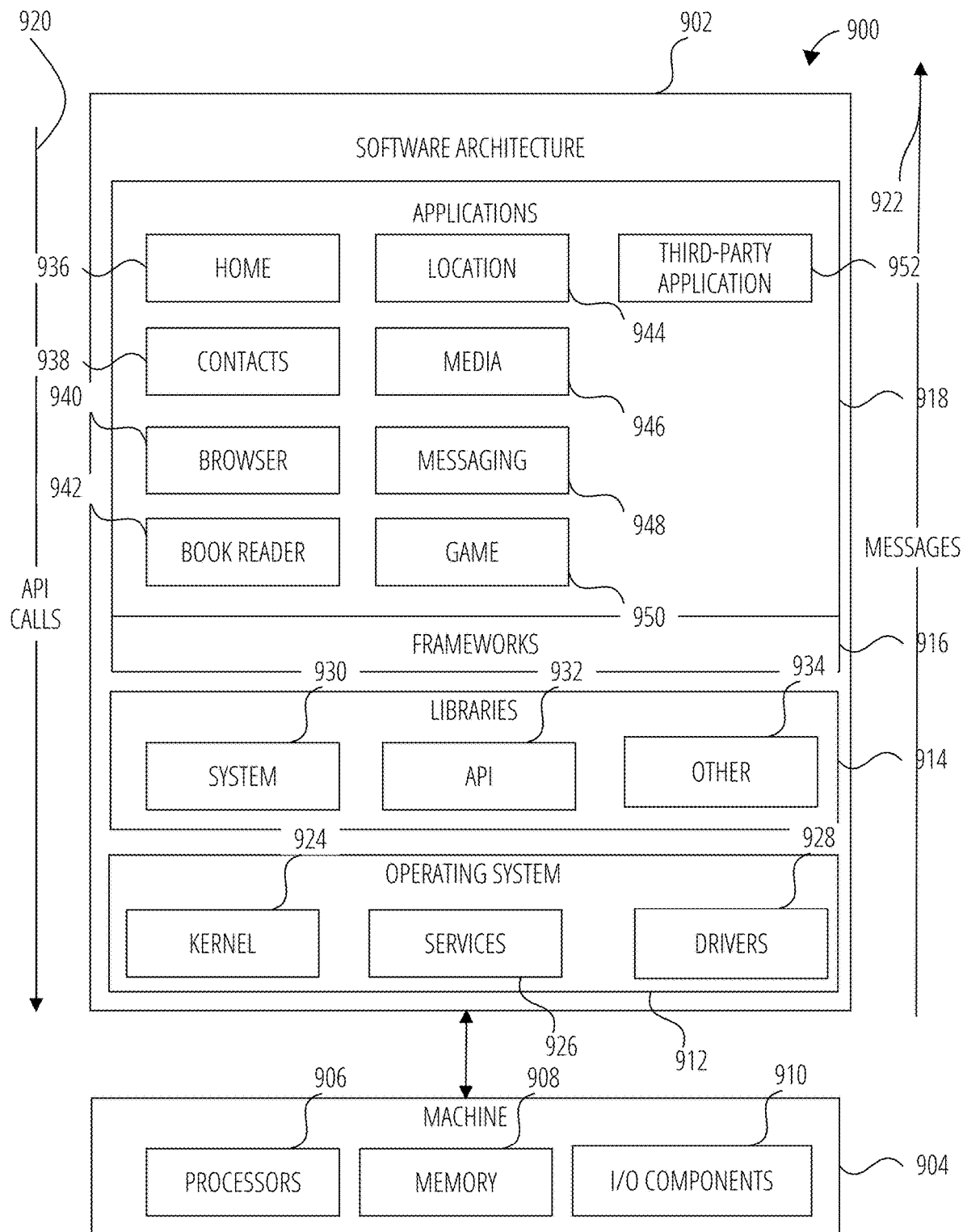
FIG. 9 is a block diagram showing a software architecture, in accordance with some examples.

FIG. 9 is a block diagram 900 illustrating a software architecture 902, which can be installed on any one or more of the devices described herein. The software architecture 902 is supported by hardware such as a machine 904 that includes processors 906, memory 908, and I/O components 910. In this example, the software architecture 902 can be conceptualized as a stack of layers, where each layer provides a particular functionality. The software architecture 902 includes layers such as an operating system 912, libraries 914, frameworks 916, and applications 918. Operationally, the applications 918 invoke API calls 920 through the software stack and receive messages 922 in response to the API calls 920.

The operating system 912 manages hardware resources and provides common services. The operating system 912 includes, for example, a kernel 924, services 926, and drivers 928. The kernel 924 acts as an abstraction layer between the hardware and the other software layers. For example, the kernel 924 provides memory management, processor management (e.g., scheduling), component management, networking, and security settings, among other functionalities. The services 926 can provide other common services for the other software layers. The drivers 928 are responsible for controlling or interfacing with the underlying hardware. For instance, the drivers 928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 914 provide a common low-level infrastructure used by the applications 918. The libraries 914 can include system libraries 930 (e.g., C standard library) that provide functions such as memory allocation functions, string manipulation functions, mathematic functions, and the like. In addition, the libraries 914 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 914 can also include a wide variety of other libraries 934 to provide many other APIs to the applications 918.

The frameworks 916 provide a common high-level infrastructure that is used by the applications 918. For example, the frameworks 916 provide various GUI functions, high-level resource management, and high-level location services. The frameworks 916 can provide a broad spectrum of other APIs that can be used by the applications 918, some of which may be specific to a particular operating system or platform.

In an example, the applications 918 may include a home application 936, a contacts application 938, a browser application 940, a book reader application 942, a location application 944, a media application 946, a messaging application 948, a game application 950, and a broad assortment of other applications such as a third-party application 952. The applications 918 are programs that execute functions defined in the programs. Various programming languages can be employed to create one or more of the applications 918, structured in a variety of manners, such as object-oriented programming languages (e.g., Objective-C, Java, or C++) or procedural programming languages (e.g., C or assembly language). In a specific example, the third-party application 952 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the third-party application 952 can invoke the API calls 920 provided by the operating system 912 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

GLOSSARY

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. Client devices may be, but are not limited to, mobile phones, desktop computers, laptops, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine-storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A computer-implemented method, comprising:
   capturing, using an eye-tracking sensor of an Extended Reality (XR) system, eye-tracking data of an eye gaze of a user of the XR system;
   determining a restricted Field Of View (FOV) for one or more scanning sensors of the XR system using the eye-tracking data of the eye gaze by setting an optical axis of the one or more scanning sensors to be parallel with a gaze vector of the eye-tracking data;
   controlling the one or more scanning sensors to operate at a first scanning velocity within the restricted FOV and at a second scanning velocity outside the restricted FOV, the first scanning velocity lower than the second scanning velocity;
   capturing sensor data of a real-world scene using the one or more scanning sensors, the restricted FOV, the first scanning velocity within the restricted FOV, and the second scanning velocity outside the restricted FOV; and
   generating, for presentation to the user, an XR user interface using the sensor data.

2. The computer-implemented method of claim 1, wherein the one or more scanning sensors comprise one or more point scanning sensors.

3. The computer-implemented method of claim 1, wherein the one or more scanning sensors comprise one or more cameras.

4. The computer-implemented method of claim 3, wherein restricting the FOV of the one or more scanning sensors comprises generating cropping data for cropping image data generated by the one or more scanning sensors.

5. The computer-implemented method of claim 1, wherein the XR system comprises a head-wearable apparatus.

6. A machine comprising:
   one or more processors; and
   memory storing instructions that, when executed by the one or more processors, cause the machine to perform operations comprising:
   capturing, using an eye-tracking sensor of an XR system, eye-tracking data of an eye gaze of a user of the XR system;
   determining a restricted FOV for one or more scanning sensors of the XR system using the eye-tracking data of the eye gaze by setting an optical axis of the one or more scanning sensors to be parallel with a gaze vector of the eye-tracking data;
   controlling the one or more scanning sensors to operate at a first scanning velocity within the restricted FOV and at a second scanning velocity outside the restricted FOV, the first scanning velocity lower than the second scanning velocity;
   capturing sensor data of a real-world scene using the one or more scanning sensors, the restricted FOV, the first scanning velocity within the restricted FOV, and the second scanning velocity outside the restricted FOV; and
   generating, for presentation to the user, an XR user interface using the sensor data.

7. The machine of claim 6, wherein the one or more scanning sensors comprise one or more point scanning sensors.

8. The machine of claim 6, wherein the one or more scanning sensors comprise one or more scanning cameras.

9. The machine of claim 8, wherein restricting the FOV of the one or more scanning sensors comprises generating cropping data for cropping image data generated by the one or more scanning sensors.

10. The machine of claim 6, wherein the XR system comprises a head-wearable apparatus.

11. A machine-storage medium including instructions that, when executed by a machine, cause the machine to perform operations comprising:
    capturing, using an eye-tracking sensor of an XR system, eye-tracking data of an eye gaze of a user of the XR system;
    determining a restricted FOV for one or more scanning sensors of the XR system using the eye-tracking data of the eye gaze by setting an optical axis of the one or more scanning sensors to be parallel with a gaze vector of the eye-tracking data;
    controlling the one or more scanning sensors to operate at a first scanning velocity within the restricted FOV and at a second scanning velocity outside the restricted FOV, the first scanning velocity lower than the second scanning velocity;

capturing sensor data of a real-world scene using the one or more scanning sensors, the restricted FOV, the first scanning velocity within the restricted FOV, and the second scanning velocity outside the restricted FOV; and generating, for presentation to the user, an XR user interface using the sensor data.

12. The machine-storage medium of claim 11, wherein the one or more scanning sensors comprise one or more point scanning sensors.

13. The machine-storage medium of claim 11, wherein the one or more scanning sensors comprise one or more scanning cameras.

14. The machine-storage medium of claim 13, wherein restricting the FOV of the one or more scanning sensors comprises generating cropping data for cropping image data generated by the one or more scanning sensors.

15. The machine-storage medium of claim 11, wherein the XR system comprises a head-wearable apparatus.

16. The computer-implemented method of claim 1, further comprising determining a scan angle of the FOV of the one or more scanning sensors based on a visual acuity of human vision.

17. The computer-implemented method of claim 2, wherein the one or more point sensors are Light Detecting and Ranging (LiDAR) sensors.

18. The machine of claim 6, wherein the operations further comprise determining a scan angle of the FOV of the one or more scanning sensors based on a visual acuity of human vision.

19. The machine of claim 7, wherein the one or more point sensors are Light Detecting and Ranging (LiDAR) sensors.

20. The machine-storage medium of claim 11, wherein the operations further comprise determining a scan angle of the FOV of the one or more scanning sensors based on a visual acuity of human vision.

21. The machine-storage medium of claim 12, wherein the one or more point sensors are Light Detecting and Ranging (LiDAR) sensors.

* * * * *